(12) United States Patent
Crosby et al.

(10) Patent No.: US 9,335,446 B2
(45) Date of Patent: May 10, 2016

(54) ADJUSTABLE REFRACTIVE OPTICAL DEVICE

(75) Inventors: David Crosby, Oxford (GB); Gregor Storey, Oxford (GB); Richard Taylor, Oxford (GB); Owen Reading, Oxford (GB)

(73) Assignee: Eyejusters LTD, Oxford, Oxfordshire (GB)

( * ) Notice: Subject to any disclaimer, the term of this patent is extended or adjusted under 35 U.S.C. 154(b) by 0 days.

(21) Appl. No.: 14/342,179

(22) PCT Filed: Sep. 3, 2012

(86) PCT No.: PCT/GB2012/052163
§ 371 (c)(1),
(2), (4) Date: Feb. 28, 2014

(87) PCT Pub. No.: WO2013/030603
PCT Pub. Date: Mar. 7, 2013

(65) Prior Publication Data
US 2014/0211148 A1    Jul. 31, 2014

(30) Foreign Application Priority Data

Sep. 1, 2011 (GB) ................................ 1115124.8

(51) Int. Cl.
*G02C 7/02* (2006.01)
*G02B 3/00* (2006.01)
(Continued)

(52) U.S. Cl.
CPC .......... *G02B 3/0081* (2013.01); *G02B 27/0012* (2013.01); *G02C 7/024* (2013.01); *G02C 7/027* (2013.01); *G02C 7/028* (2013.01); *G02C 7/081* (2013.01); *G02C 2202/20* (2013.01)

(58) Field of Classification Search
CPC ........ G02C 7/024; G02C 7/027; G02C 7/028; G02C 7/081; G02B 3/0081; G02B 27/0012
USPC ............... 351/159.7, 159.73, 159.74, 159.75, 351/159.76; 359/642, 683, 721, 741, 796
See application file for complete search history.

(56) References Cited

U.S. PATENT DOCUMENTS 1,143,316 A    6/1915    Poullain et al.
1,771,844 A    7/1927    Eilenberg et al.
(Continued)

FOREIGN PATENT DOCUMENTS

CA    800292 A    12/1968
CA    800295 A    12/1968
(Continued)

OTHER PUBLICATIONS

Barbero S. et al., "Adjustable-focus lenses based on the Alvarez principle," IOP Publishing, Journal of Optics, J. Opt. 13 (2011) 125705 (11 pp).

*Primary Examiner* — Darryl J Collins
(74) *Attorney, Agent, or Firm* — Preti Flaherty Beliveau & Pachios LLP

(57) ABSTRACT

A method of making a lens having adjustable optical power is disclosed. The lens is adjustable by relative lateral translation of at least two lens elements. The method may comprise providing a function yielding optical properties of the lens from starting geometries for the lens elements; refining the function to approximate required gaze angle optical performance over a range of said lateral translation; and using the refined function to derive geometries for making the lens elements. The function may comprise first and second functional parts respectively for the lens elements, and the method comprises using the function to derive geometries for making the lens elements, wherein the function relates optical path difference to a position across the lens elements, and the rate of change of curvature of the first functional part with position is different to the rate of change of curvature of the second functional part with position. There is also disclosed a lens having adjustable optical power. The lens is adjustable by relative lateral translation of at least two lens elements. The adjustable lens may be used for corrective eyeglasses.

71 Claims, 13 Drawing Sheets

(51) Int. Cl.
*G02B 27/00* (2006.01)
*G02C 7/08* (2006.01)

(56) References Cited

U.S. PATENT DOCUMENTS

| | | | |
|---|---|---|---|
| 1,692,973 A | 11/1928 | Babcock | |
| 2,001,952 A | 5/1935 | Birchall | |
| 3,305,294 A | 2/1967 | Alvarez | |
| 3,507,565 A | 4/1970 | Alvarez | |
| 3,583,790 A | 6/1971 | Baker | |
| 3,827,798 A | 8/1974 | Alvarez | |
| 4,457,592 A | 7/1984 | Baker | |
| 4,925,281 A | 5/1990 | Baker | |
| 5,644,374 A | 7/1997 | Mukaiyama et al. | |
| 7,232,217 B2 | 6/2007 | Spivey | |
| 7,325,922 B2 | 2/2008 | Spivey | |
| 7,338,159 B2 | 3/2008 | Spivey | |
| 7,372,646 B2 | 5/2008 | Spivey | |
| 7,717,552 B2 | 5/2010 | Spivey | |
| 7,841,715 B1 * | 11/2010 | Morrison | 351/159.48 |
| 8,197,062 B1 | 6/2012 | Morrison | |
| 2006/0209431 A1 | 9/2006 | Spivey | |
| 2007/0030440 A1 | 2/2007 | Spivey | |
| 2007/0091257 A1 | 4/2007 | Spivey | |
| 2008/0151184 A1 * | 6/2008 | Spivey et al. | 351/178 |
| 2009/0279046 A1 | 11/2009 | Dreher et al. | |
| 2012/0057124 A1 | 3/2012 | Spivey et al. | |
| 2012/0113393 A1 | 5/2012 | Spivey et al. | |
| 2012/0194781 A1 | 8/2012 | Agurok | |

FOREIGN PATENT DOCUMENTS

| | | |
|---|---|---|
| EP | 2044905 | 4/2009 |
| GB | 250268 | 7/1926 |
| GB | 998191 | 7/1965 |

* cited by examiner

Mean Sphere Power at 0 D

Cylinder Power (D)

Mean Sphere Power at 2.0 D

Cylinder Power (D)

ADJUSTABLE REFRACTIVE OPTICAL DEVICE

TECHNICAL FIELD

The present invention relates to an adjustable refractive optical device. In particular, the invention relates to a lens comprised of a plurality of lens elements, the lens having optical power adjustable by relative lateral translation of at least two lens elements. The invention is particularly suited to, but not limited to, corrective eyeglasses.

BACKGROUND ART

Devices providing adjustable optical power have been proposed for use as corrective lenses in prescription eyeglasses. Eyeglasses equipped with adjustable lenses have significant potential in the developing world, where a single model of eyeglasses with an appropriate optical power range can be used to correct refractive error in a large section of a population. Such a model of eyeglasses could be deployed without the use of eye care professionals and so bring vision correction to many populations who are currently underserved. In an article by Zhang, M et al., "Self correction of refractive error among young people in rural China: results of cross sectional investigation", BMJ 2011; 343:d4767, it is demonstrated that a model of adjustable eyeglasses used as a self-correction device and applied using a protocol supervised by trained lay persons can achieve good visual outcomes for young people aged 12-18. A model of eyeglasses equipped with adjustable lenses can be used to correct presbyopia amongst adults in both developing and developed world situations, assuming that model can provide a modest range of positive optical power. This allows the wearer to adjust the power to suit various tasks such as reading, using a personal computer or other close work.

In order to function effectively adjustable lenses must provide a satisfactory level of optical performance, which will depend on the context in which the lenses are applied. For an application such as adjustable power corrective lenses in eyeglasses the device should provide good quality correction with low higher-order aberrations (preferably less than a quarter wavelength of 633 nm light for a pupil diameter of 4 mm) over the region of required optical correction (which may or may not be the entire lens), good transmission, low distortion, and low variation of mean spherical power and any unwanted astigmatism over a range of viewing directions through the lens (corresponding to the eyeball rotating to look through different parts of the lens).

The adjustable lenses should provide a range of corrective power useful for the intended the application. For example, for presbyopic applications a range of 2 to 4 dioptres may be appropriate. The lenses should not be excessively thick or heavy as this will have a negative effect on the appearance of eyeglasses and may also make a pair of eyeglasses featuring such lenses uncomfortable to wear.

It is known that a lens with adjustable power may be realised by employing two separate optical elements which may be moved relative to each other. For example, it is well known in elementary optics that the combination of two thin lenses of power $P_1$ and $P_2$ arranged such that their optical surfaces are substantially perpendicular to an optical axis and aligned so that the lens centres of the thin lenses lie on the optical axis has an overall optical power P given by the equation $$P = P_1 + P_2 - P_1 P_2 t, \quad (1)$$

where t is the distance between the lens centres as measured along the viewing axis. Thus, by altering the distance t between the thin lenses a variation in the overall optical power of the system may be achieved. This principle is used to good effect in many optical devices. For example, the basic principle underlies the focusing elements in some simple camera lens designs. However, for some applications the requirement of an adjustable distance between two lens elements along an optical axis is undesirable as it will typically result in a system that has considerable total thickness, as measured along the optical axis from the front of the first lens to the back of the second lens. A large thickness may be a problem if limited space is available or in applications such as eyewear to correct for refractive error, where thin lenses are generally regarded to be cosmetically desirable as well as lighter and more comfortable to wear.

In the prior art work U.S. Pat. No. 3,305,294 by Alvarez an approach is described where two separate, specially shaped optical plates are moved relative to each other along an axis perpendicular to a central viewing axis along which the optical elements are arranged. In the preferred embodiment of U.S. Pat. No. 3,305,294 the optical device is composed of two refracting optical plate elements which are generally perpendicular to a central viewing axis. The variation of thickness of each of the plates is described by a cubic polynomial of Cartesian (x,y) coordinates in a plane perpendicular to the central viewing axis as shown schematically in FIG. 1. The variation in thickness is complementary in that when the plates are placed in a neutral position (defined as where the origin of the cubic thickness profiles of each of the plates lies on the optical axis) the cubic polynomial terms for the two plates have the same magnitude as each other but opposite sign. This complementary design of thickness variations results in a device that provides a variable amount of optical power when the plates are aligned together and slid relative to each other along the designated axis and viewed along a suitably arranged axis. Whilst achieving a reasonably thin system of lenses, the overall performance of optical devices based on the approach described in U.S. Pat. No. 3,305,294 is limited. This is particularly noticeable for applications where the actual viewing axis deviates in direction from the central viewing axis resulting in significant and unwanted variation in mean spherical optical power and astigmatism. This is described in more detail below.

In the prior art work U.S. Pat. No. 3,583,790, by Baker, a similar approach to U.S. Pat. No. 3,305,294 is described except the thickness variation of the optical plates are described by a fifth order polynomial function. As in U.S. Pat. No. 3,305,294 the variations in thickness of the two optical plates when in the neutral position are equal in magnitude and opposite in sign. The use of a quintic polynomial to describe thickness variation allows for better control of aberrations and superior optical performance for certain applications. However, the performance of the lens is again not well suited to applications where viewing through a wide range of angles is required, such as is the case for corrective lenses in eyeglasses.

U.S. Pat. No. 7,338,159 by Spivey discloses a technique for improving the performance of lenses based on optical elements moved relative to each other. The approach taken here again is to incorporate extra terms in the polynomial expression for the profiles of the optical plates with the goal of improving the optical performance of the resulting adjustable lenses.

U.S. Pat. No. 7,717,552 also by Spivey presents adjustable focus eyeglasses that make use of adjustable power lenses based on two elements with a pivot adjustment. This alternative mode of actuation results in a different form for the thickness variation of the individual elements, but the same principle is retained as with the other prior art work. This approach adds significant mechanical complication to the resulting design of the adjustable glasses.

U.S. Pat. No. 5,644,374 by Mukaiyama discloses a variable focus eyesight correction apparatus of a similar arrangement to Alvarez and Spivey, but states that contours of optical power of the lenses should be linear and parallel to principal meridians of the lenses.

SUMMARY OF THE INVENTION

The present invention provides a method of designing a lens having optical power adjustable by relative lateral translation of at least two lens elements or plates, the method comprising: providing a function having a first functional part yielding optical properties of a first lens element from geometry of the first lens element, the function having a second functional part yielding optical properties of a second lens element from geometry of the second lens element; and using the function to derive geometries for making the lens elements, wherein the function relates optical path difference to position across the lens elements, and the rate of change of curvature of the first functional part with position is different to the rate of change of curvature of the second functional part with position. The rates of change may be considered different if their magnitudes are different. Position may be a coordinate position measured from a central viewing axis or neutral axis of the lens elements. The function may include one or more of a mathematical function, algorithms, and further method steps. The function may be divided into two or more functional parts, each relating to one of the lens elements. Lateral translation comprises movement in a general sideways or side-to-side direction, or vertical or diagonal direction etc., and is not limited to movement orthogonal to a central viewing axis. The trajectory of the translation may include some movement along the central viewing axis but will include a sideways or other orthogonal component. The optical path difference takes into account thickness, refractive index and a variety of lens configurations and shapes. Here the term "lens elements" is used to define components of the lens, but alternatively "plates" may be used.

When the rate of change of curvature of the first functional part with position is different to the rate of change of curvature of the second functional part with position, this may be such that a gaze angle through the lens intersects the first lens element at a different position to that it intersects the second lens element. The different rates of change of curvature with position results in the optical properties of the lens elements at said gaze angle being complementary. For example, by using different rates of change of curvature it is possible to reduce variation in optical power of the lens system with gaze angle. In general as we move away from the central viewing axis, regions of the first lens element having positive optical power overlap or coincide with regions of the second lens element having negative power.

A gaze angle is an angle to the central viewing axis. Gaze position is the position at the lens where the optical path followed by the gaze angle intersects the lens. The intersection may be considered at the front and back surfaces of each lens element. The gaze position may be defined with respect to a coordinate system with an origin at the central viewing axis. Refraction of the optical path at interfaces may also be taken into account in considering gaze positions. The rate of change of curvature may be taken with respect to gaze angle, gaze position or coordinate position. Gaze angle optical performance is defined to mean the measurement of the optical performance of a lens element or the lens system over a range of gaze angles. Gaze angle optical path is the trajectory of an optical ray centred on the pupil aligned at a specified gaze angle and propagated through the optical system according to the physics of ray optics.

The optical path difference of a first lens element may be determined at a first coordinate position the gaze angle direction intersects the first lens, and the optical path difference of a second lens element may be determined at a second coordinate position the gaze angle direction intersects the second lens.

The rate of change of curvature of the first functional part and second functional part may be related by a multiplier. The multiplier is a constant for a lens element pair or set. Curvature may be considered to be the second derivative or derivatives with respect to position on the lens.

The first lens element may be a pupil side lens element and the second lens element may be an object side lens element; and the multiplier may have a magnitude less than unity to stretch, laterally across the lens, the variation of optical properties of the second lens element relative to the first lens element. This pupil side-object side arrangement for specifying the multiplier is appropriate for corrective eyewear and other applications. Some alternative embodiments may reverse the pupil to object orientation. Pupil-side and object-side lens elements may alternatively be referred to respectively as rear and front lens elements or plates.

The multiplier preferably may have a magnitude less than unity and greater than or equal to 0.5, such as in the range 0.99 to 0.7, or in the range 0.99 to 0.9.

The multiplier may be negative such that the direction of variation optical properties of the first lens element is opposite to the direction of variation optical properties of the second lens element.

The gaze position may be the position on the lens at which a gaze angle optical path intersects the lens elements.

The present invention further provides a method of making a lens having optical power adjustable by relative lateral translation of at least two lens elements, the method comprising: providing a function yielding optical properties of the lens from starting geometries for the lens elements; refining the function to at least approximate required gaze angle optical performance over a range of said lateral translation; and using the refined function to derive geometries for making the lens elements. The step of refining the function may include using optical path difference at various gaze angles. Comments above regarding gaze angle, gaze position, lateral translation, function, optical path difference and viewing direction apply equally to this method.

The function may yield optical performance of the lens from the geometry and lateral translation of the lens elements. The function may comprise a relation between optical path difference and geometry of the lens. The function may define optical path difference variation across the lens. Optical path difference may be considered to be the difference relative to a reference such as the optical path length at a central viewing axis or other local point, or the difference compared to a direct path through air in the absence of the lens. The function may relate optical path difference to a coordinate position relative to a central axis. Alternatively the function may relate optical path difference to a gaze angle or a gaze position through the lens. The gaze position may be the position on the lens at which a gaze angle optical path intersects the lens elements.

The function may comprise: a first functional part yielding optical properties of a first lens element from the geometry of the first lens element; and a second functional part yielding optical properties of a second lens element from the geometry of the second lens element.

The magnitude of the rate of change of the curvature of the first functional part with position may be different to the magnitude of the rate of change of curvature of the second functional part with position. The rate of change of curvature of the first functional part and second functional part may be related by a multiplier.

The first lens element may be a pupil side lens element and the second lens element may be an object side lens element. The multiplier may have a magnitude less than unity to stretch, laterally across the lens, the variation of optical properties of the second lens element relative to the first lens element. This stretching is the preferred arrangement for corrective eyeglasses but other embodiments may reverse the stretch so that the pupil side lens is stretched relative to the object side lens.

The multiplier may have a magnitude less than unity and greater than or equal to 0.5, such as in the range 0.99 to 0.7 or in the range 0.99 to 0.9.

The multiplier may be negative such that the direction of variation optical properties of the first lens element is opposite to the direction of variation optical properties of the second lens element.

The geometries of the lens elements may include the optical thickness of the lens elements based on the refractive index of material for making the lens elements. Optical thickness may be determined from the physical thickness and refractive index.

The rate of change of curvature may be a rate of change of curvature of a surface of a lens element.

The function may comprise a first functional part yielding optical path difference $\phi_{12}$ of a first lens element from $$\varphi_{12}(x, y) = \alpha\left(\frac{1}{3}x^3 + xy^2\right)$$

and a second functional part yielding optical path difference $\phi_{13}$ of a second lens element from $$\varphi_{13}(x, y) = k\alpha\left(\frac{1}{3}x^3 + xy^2\right)$$

where x and y are coordinate position on the respective lens element with respect to an origin centred at the central viewing axis of the lens element, $\alpha$ is a constant related to the rate of change of optical properties with lateral translation, and k is a multiplier having a magnitude less than unity to stretch, laterally across the lens, the variation of optical properties of the second lens element relative to the first lens element.

The method may further comprise determining the optical power across the lens at a lateral translation by calculating curvature of the optical path difference with respect to gaze angle.

The method may further comprise determining the optical power across the lens at a plurality of lateral translations and optimizing the function to minimize variations in a required optical power with gaze angle.

The method may comprise: determining the optical performance of the lens at gaze angles and lateral translations; refining the function by adjusting parameters of the function to optimize a merit function; and iterating the steps of determining and refining until the optical properties meet the required gaze angle optical performance. The step of determining may comprise ray tracing to simulate the performance of the lens at a plurality of gaze angles. The merit function may be a measure of the performance of the lens in a single scalar value or a plurality of values. The merit function may be a measure of at least variation of optical power with gaze angle. The merit function may further comprise a measure of lens thickness.

The lens has a central viewing axis centred with respect to gaze angles, and the relative lateral translation may be along a trajectory crossing the central viewing axis. The trajectory may intersect the central viewing axis substantially orthogonally. The trajectory may be a two or three-dimensional path. The trajectory may be substantially a straight line or arcuate line.

The function may relate position on the lens to optical path difference using a Cartesian coordinate system with the z-axis along a central viewing axis and the x-axis and y-axis lie in a plane approximately perpendicular to the central viewing axis, and the x axis is aligned with the lateral translation direction. The function may be refined to take account of a change of optical power of a wavefront with propagation distance.

The method may comprise including an $x^4$ and $x^2y^2$ term to the function relating position to optical path difference. The $x^4$ and $x^2y^2$ term may be of the form $$\gamma_{12}\left(\frac{1}{12}x^4 + \frac{1}{2}x^2y^2\right)$$

for the first lens, and of the form $$\gamma_{13}\left(\frac{1}{12}x^4 + \frac{1}{2}x^2y^2\right)$$

for the second lens, wherein $\gamma_{12}$ and $\gamma_{13}$ are different such that the variation of optical properties of the second lens element is different relative to the first lens element.

The method may comprise using numerical methods to minimise differences between the function and target values for optical performance with respect to gaze angle.

The function may be a representation of optical path difference, and may be a Non-Uniform Rational B-Spline surface (NURBS) or a Zernike polynomial. Refinements to the function may be made by changing the values of parameters associated with the representation. Parameters of the Non-Uniform Rational B-Spline surface (NURBS) which may be changed are knot locations and control point coordinates.

The representation may additionally or instead use a Zernike polynomial and the parameters changed may be coefficients associated with each polynomial term.

The method may comprise iteratively refining the function to minimize the difference in gaze angle optical performance compared to a target. The target may be specified across a range of gaze angles. The target may be weighted between a central viewing axis and gaze angles. The method may comprise iteratively refining the function to optimize a scalar merit function.

The method may further comprise calculating a lens optical path difference based on the function and reducing the lens optical path difference at the periphery by including a series of zones each zone designated by an index, a zone being bordered by a further zone differing in index by one, each zone having an optical path difference reduced by a constant within the zone. Each zone successively further from the central viewing axis has an increase in the magnitude of the constant. Alternatively or analogously, the method may comprise calculating a lens thickness based on the function and reducing the lens thickness at the periphery by including a series of zones each zone designated by an index, a zone being bordered by a further zone differing in index by one, each zone having a thickness reduced by a constant within the zone. Each zone successively further from the central viewing axis has an increase in the magnitude of the constant. The width of the zones may set according to the desired maximum optical path difference or thickness of the lens. The zones may correspond to Fresnel zones, but will not cover the whole of the lens.

The method may further comprise including a blending region at the edge of the lens, the blending region providing mechanical constraints on lens thickness for mounting, and providing surface continuity with a viewing region.

The relative lateral translation may comprise laterally translating the lens elements in opposite directions to adjust said optical power.

The method may further comprise including in the function a prescription correction feature to the lens. For example, the prescription correction feature may include a fixed spherical and or cylindrical optical power, which is supplemented by additional variable optical power provided by the lens elements. The prescription feature may additionally or instead include a bifocal or multifocal feature.

The relative lateral translation may comprise maintaining one lens element fixed with respect to a pupil, and laterally translating the other lens element to adjust said optical power. In such a case it may be advantageous to include a variable prismatic correction to the translatable lens element. The variable prismatic correction may comprise adding a function proportional to $x^2$ to an optical path difference function for the translatable lens element.

The method may comprise optimizing the gaze angle optical properties for a designated application, such as ophthalmic lenses for eyeglasses. The trajectory may orthogonally intersect a central viewing axis of the lens and follow a direction along a line joining the pair of lenses of the eyeglasses. The required gaze angle optical performance for the eyeglasses may be less than 2.0, 1.0 or 0.5 dioptres optical power variation across substantially all gaze angles.

The method may further comprise making the lens.

The present invention provides a lens manufactured according to the any of the above methods.

The present invention provides a computer program comprising computer program code operable to put into effect any of the above described methods.

The present invention provides a computer readable medium comprising said computer program.

The present invention further provides a lens having optical power adjustable by relative lateral translation of at least two elements, the lens comprising: a first lens element having an optical path difference through the lens element varying as a first function of position across the lens element; a second lens element having an optical path difference through the lens element varying as a second function of position across the lens element, said second lens element being an object side lens element, wherein the first and second function are different such as related by a multiplier having a magnitude less than unity to stretch the optical properties of the second lens element relative to the first lens element to meet required gaze angle properties over a range of said lateral translation. In some embodiments the lens may be considered a compound lens. The comments above regarding gaze angle, gaze position, lateral translation, function, optical path difference and viewing direction apply equally to the lens.

The first function and second function together may relate the optical path difference through the lens to the position across the lens, such as position relative to a central viewing axis.

The lens elements may be arranged to form the lens such that the multiplier is negative such that the optical path difference variation of the first lens element is in an opposite lateral direction to the optical path difference variation of the second lens element.

The multiplier may have a magnitude less than unity and greater than or equal to 0.5, such as in the range 0.99 to 0.7, or in the range 0.99 to 0.9.

The first lens element may be of constant refractive index and position dependent thickness determines optical path difference. The second lens element may be of constant refractive index and the position dependent thickness determines optical path difference.

The present invention provides corrective eyewear comprising one or two variable optical power lenses as described above.

BRIEF DESCRIPTION OF THE DRAWINGS

Embodiments of the present invention and aspects of the prior art will now be described with reference to the accompanying drawings.

FIG. 2A shows a side view with an eye viewing along the central viewing axis. FIG. 2B shows a side view with an eye viewing along a gaze angle away form the central axis.

FIG. 9A shows two lens elements configured for equal and opposite lateral translation. FIG. 9B shows two lens elements with the rear element fixed and the front element arranged for lateral translation (although alternatively the rear element only may be arranged for lateral translation). FIG. 9C shows two lens elements with the rear element fixed and the front element arranged for lateral translation and including prismatic compensation (although alternatively the rear element only may be arranged for lateral translation and may include the prismatic compensation).

DETAILED DESCRIPTION

The present invention is particularly concerned with the use of lenses with adjustable power, for example, to provide ophthalmic vision correction for conditions such as myopia, hyperopia and presbyopia. Myopia and hyperopia are respectively known as nearsightedness and farsightedness. Presbyopia is a condition common in old age in which the eye exhibits a diminished ability to focus on near objects.

To deliver good optical performance for a particular application it is essential that suitable performance requirements are specified and a means of attaining or optimizing towards these requirements is implemented.

Overview of Method

It is known that the human eye provides the highest resolution over a small region of the retina called the fovea centralis. This region is approximately 1 mm in diameter and corresponds to an approximately 2 degree field of view. In order to observe an object with high resolution vision an individual will move the object into the field of view of the fovea centralis. This may be accomplished by the observer turning their head towards the object, turning their eyes towards the object, moving the object itself (if possible) or a combination of all three of these movements. Turning one's head or moving the object does not alter the orientation of the eye with respect to any lens system through which the eye is viewing, such as corrective lenses in eyeglasses. However, movement of the eye with respect to the head will change the portion of a lens mounted into eyeglasses through which the axis of high resolution passes.

The axis of high resolution vision is defined as the central viewing axis and gaze angle is the degree of rotation of this axis from central viewing (i.e. looking straight ahead).

Figure 1:
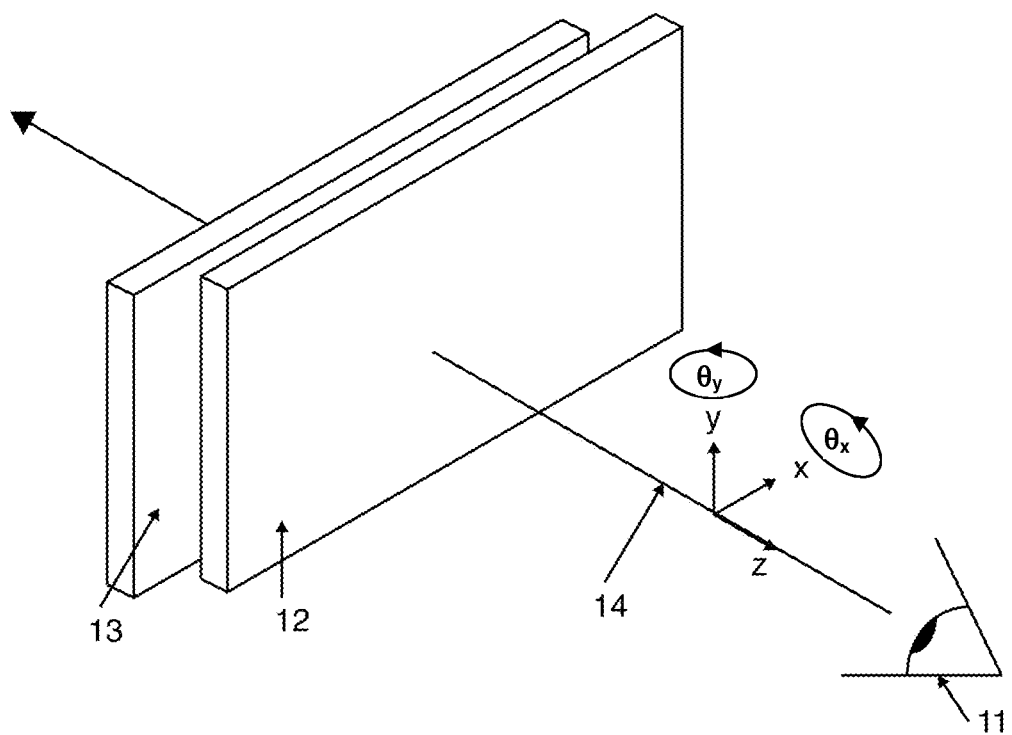
FIG. 1 is a schematic perspective view of the basic optical arrangement for a lens comprised of two lens elements, the two lenses translatable to change the optical power.
Figure 2A:
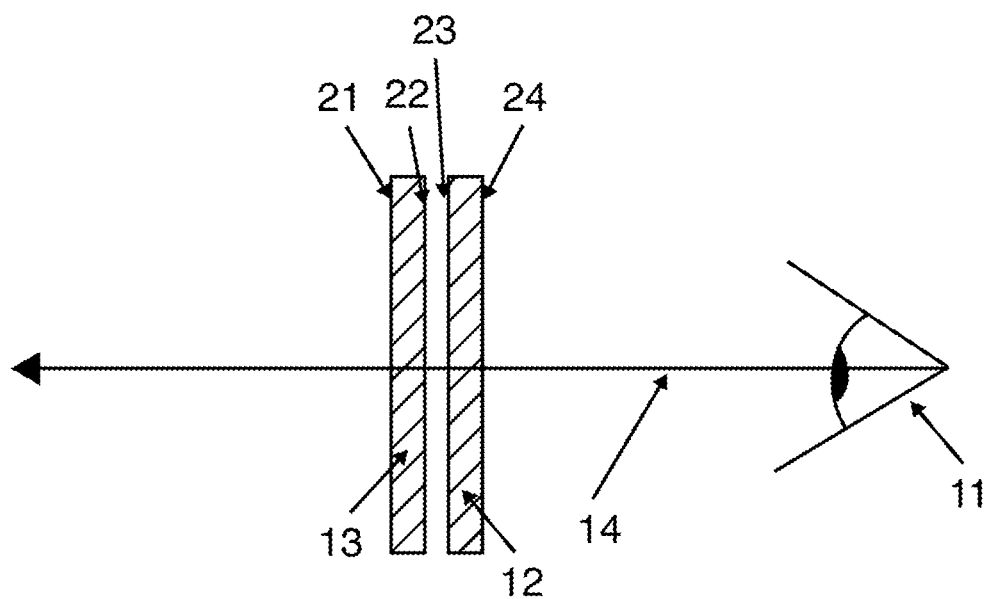
FIGS. 2A and 2B are side views of two arrangements for viewing the lens of FIG. 1.
Figure 2B:
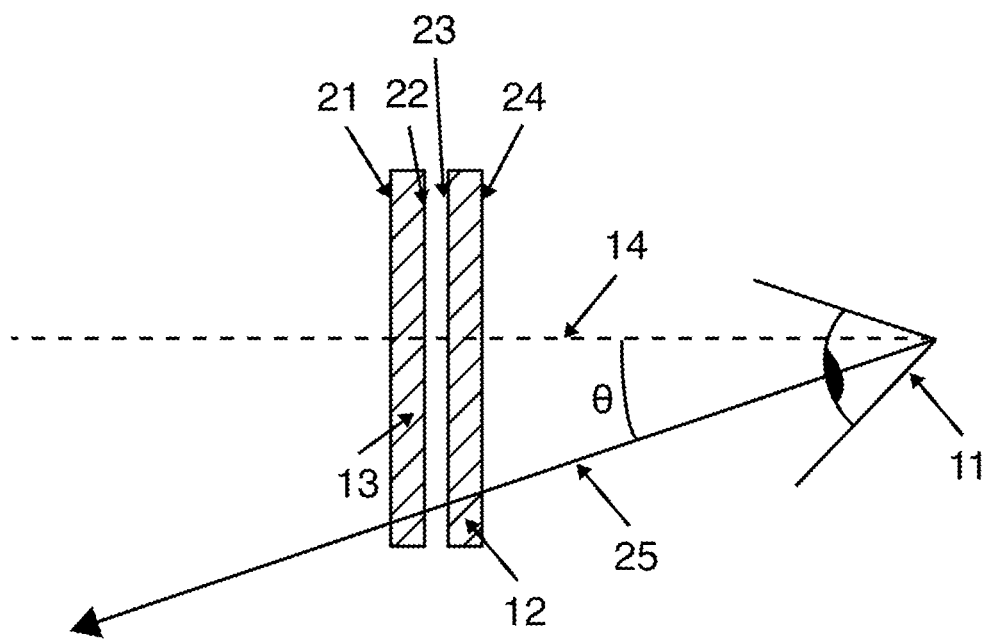

In general two gaze angles are required to account for both vertical and horizontal tilts of the eye. With reference to the coordinate system illustrated in FIG. 1 the rotational motion of the eye could be specified by a rotation of $\theta_y$ about the y-axis followed by a rotation of $\theta_x$ about the x-axis. The term gaze angle is intended to refer generally to both the horizontal gaze angle (specified by $\theta_y$) and the vertical gaze angle (specified by $\theta_x$). It is worth noting that many other schemes for describing the rotation of a rigid body would also be valid. The centre of rotation varies between individual eyes, but is located close to the geometric centre of the eye and the variation is not so great as to strongly affect analysis and optimization of lenses for correcting vision to a good standard. In the work described herein a nominal value of 13 mm from the front of the eye has been used. FIGS. 2A and 2B show a lens system comprised of two elements 12, 13, each having front and back surfaces. The lens is viewed by an eye 11 along a central viewing axis 14 in FIG. 2A, and along an off axis gaze direction 25 in FIG. 2B. The off axis gaze direction makes an angle $\theta$ with the central viewing axis. The distance between the back surface of the lens system (24 in FIG. 2A) and the front surface of the eye must also be specified for a given analysis. In the work described herein a nominal value of 13 mm is used, giving a distance of 26 mm between the back surface of the lens system and the centre of rotation of the eye. The motion of the human eye within the eye-socket is not strictly a pure rotation as the network of muscles providing the movement also induce some shift in the overall position of the eyeball, meaning that the centre of rotation is not fixed. However, this effect is small and for the purposes of calculating visual performance it is adequate to use rotations of the viewing axis of the eye to represent the motion of the eye within its socket.

It should be noted that the position of the eyeball with respect to a corrective lens mounted in a pair of eyeglasses can vary, for example by variations between individuals in the distance between the eye and the nose. When using the same model of eyeglasses, this will lead to different relative positions of the eye with respect to the lenses of the eyeglasses. By ensuring that the corrective lenses are mounted into eyeglass frames with appropriate adjustability, such as in the nose-pads to ensure a comfortable fit to an individual nose, the degree of variation can be mitigated somewhat. Further mitigation is provided by making use of multiple frame models, each designed to fit individuals within a certain range of anthropometric dimensions. Nevertheless, an optical system for vision correction should be designed in such a way that good performance is maintained over a range of relative eyeball positions. In the inventions described herein such alignment tolerances may be inspected by performing analyses (e.g. by numerical ray-tracing) in a number of configurations, each of which has different relative coordinates for the centre of the eye with respect to the corrective lens. It has been found that variations of +/−3 mm in each of the x, y and z directions (as shown in FIG. 1) provide a good range for this alignment tolerance.

Since it is quite normal for an individual to turn their eyes to direct their vision it is important that good optical performance is maintained over a sufficient range of gaze angles. However, the small field of view for high resolution vision means that the optical performance at a given gaze angle should concentrate on ensuring that good vision is achieved over this small field of view. A reduction in optical performance outside of this small field of view for a given fixed gaze angle is less important as the eye is less able to notice such reduced performance as long as good optical performance is maintained as the gaze angle itself is changed by rotation of the eye. Furthermore, the pupil of the human eye is typically 2-6 mm in diameter. This means that only a small patch of a corrective lens is used for high resolution vision at a given gaze angle. Only rays passing through to the pupil will affect the image attained by the eye, thus only small regions of the components of a lens system affect the optical performance attained at a given gaze angle. Other parts of the lens system are then required to provide good optical performance at different gaze angles. Thus the concept of gaze angle, in conjunction with the small field of view for high resolution vision and the relatively small size of the human pupil, is an important factor in the design of optical systems for vision correction and is an important part of the invention described herein.

For vision correction applications important performance requirements are that the adjustable power lens system should deliver uniform optical power (which will ensure that the focussing provided by the lens is consistent) and low distortion, both with respect to gaze angle. The resulting lens system should also be reasonably thin, light and of a size sufficient to deliver the required field of view for a user, i.e. allow a sufficient range of gaze angles to be viewed through the lens system.

FIG. 2A shows a side view of an arrangement for viewing in this invention along the central axis of the lens system 14. FIG. 2B shows a side view for viewing at a vertical gaze angle of θ (i.e. $\theta_x=\theta$ for this arrangement). In general, the axis of gaze intersects the surfaces of the optical plates 21, 22, 23, 24 at different (x,y) coordinates. The position of these points of intersection may be determined by direct calculation (for simple optical systems) or numerical simulation, such as ray tracing.

FIGS. 3A-3G show various configurations of lens elements or plates for forming an adjustable optical power lens. The approach described above may be used for any of the configurations illustrated by FIGS. 3A-3G. If one or both of the plates are moved then it is still a simple matter to convert the coordinates of the ray intersection point on the moved plate into the coordinates relative to the coordinate origin of the plates by applying a shift to the coordinate values that is equal and opposite to the applied shift.

The optical power for observation along a particular gaze angle may be determined by methods, such as numerical simulation by ray-tracing. Optical power may be determined by examination of the change in the focusing properties of light on propagation through the lens system. Such an analysis should be confined to a local region as determined by the finite size of the eye pupil (typically 2-6 mm). For an analysis using ray tracing one would typically start with a bundle of rays emanating from a point source (which may be at infinity, leading to an initially collimated bundle of rays) such that when they reach the eye the rays are distributed across the pupil. Optical power may then be determined by looking at the convergence or divergence of the ray bundle after propagation through the lens system. In general, any focusing will be astigmatic and so specified by spherical focussing power, cylindrical focussing power and an angle describing the orientation of the cylinder with respect to a fiducial reference direction. The behaviour of the rays will also contain information pertaining to higher order aberrations, and these may also be computed by methods. Distortion is defined as variation in the optical magnification of the system with respect to gaze angle. For a system with good imaging properties it is known by those skilled in the art that this may be determined by calculating the bending of the direction of a ray corresponding to observation along a particular direction (defined here by gaze angle). By examining the variation of this bending with respect to gaze angle the distortion of the system may be determined.

For applications in vision correction with eyeglasses it has been determined by the inventors that achieving uniform optical power is more important than minimizing distortion as it is known that the brain is able to adapt effectively to small distortions in the visual field, whereas little can be done for observation that is out of focus and blurry.

The general approach for designing the optical systems described herein starts with a chosen configuration for the system corresponding to a lens comprising a pair of lens elements or plates such as illustrated by FIGS. 3A to 3G. The general steps of the approach are set out in FIG. 4. A first step 401 is to define a starting configuration and suitable starting equation to define that configuration. The choice of configuration enables a relationship to be determined between the optical path difference functions for the optical plates and the resulting geometry of these plates, this is crucial if a system that can be manufactured is to be realised. An initial geometry is further specified by choosing the required sensitivity for the power variation of the system with respect to movement of the plates. The method for moving the plates, including which plates move and the paths along which the plates move is also specified. The sensitivity of power variation in conjunction with the range of movements of the plates then determines the range of optical power that the system will provide. The orientation and position of the eye with respect to the system is selected, usually on the basis of a desired setup for using the system as an adjustable power corrective lens mounted in eyeglasses. The range of gaze angles over which the optical system is expected to function is also selected. Finally, initial values for parameters controlling the thickness of the elements of the system are then determined. In general these thicknesses are minimized whilst ensuring that the resulting optical elements can be manufactured and provide sufficient strength.

Having determined an initial geometry for the system the optical performance may then be computed (step 402 in FIG. 4) by a number of methods including but not limited to direct calculation or numerical simulation by ray tracing. In particular, numerical ray tracing is a powerful and general method for simulating the optical performance of systems such as those described by this invention. In this invention optical performance is determined over a range of gaze angles wherein at each gaze angle position measurements of properties such as optical power and distortion are made. In a numerical simulation of the system the range of gaze angles is spanned by sampling a number of discrete gaze angle positions in both the horizontal and vertical gaze directions. For example, simulation of the system may be performed on a grid of values for $\theta_x$ and $\theta_y$. The required optical properties of the system are then computed at each sampling point of gaze angle specified by $\theta_x$ and $\theta_y$. As the system described has variable optical properties determined by movement of the optical plates it is also necessary to conduct this measurement of optical performance at a number of positions of the optical plates, corresponding to a number of settings of the optical power of the system. The computation of optical performance may also be performed over a range of positions for the eye with respect to the lens system.

The results from this computation of the optical performance of the system are then used to modify the optical path difference (opd) functions describing the optical plates with a view to improving the performance of the system. This also forms part of step 402 in FIG. 4. The coordinates of the surfaces of the optical plates corresponding to a particular gaze angle may also be determined from a ray tracing analysis, thus allowing a relationship to be determined between the optical performance of the system with respect to gaze angle and the positions on the optical plates responsible for yielding such optical performance.

The scope and nature of such modifications depend on the chosen representation for the opd functions describing the optical plates. For simple representations with a few parameters changes to performance may be determined by making changes to the values of parameters describing the system and computing again its performance with a view to finding changes to new values for parameters that improve performance. In such approaches it is helpful to capture in a single scalar value a measure of the overall performance of the system. This is an approach familiar to those skilled in the art of optical design wherein the designer constructs a merit function that takes the results of an analysis of a system and compares it to a set of targets and computes a value determined from the difference between the actual system and the target performance. For example, if uniform optical power with respect to gaze angle is desired then a merit function could be derived based on the squared sum of variations of actual optical power with respect to gaze angle. Here a reduced value of the merit function would correspond to improved performance. Optimization of the system may then be performed by finding the minimum value of the merit function with respect to the available parameters. Such minimization may be performed using a variety of methods familiar to those skilled in the art including but not limited to Newton's method, conjugate gradient methods, the Simplex algorithm, simulated annealing, and genetic algorithms.

With more sophisticated representations for the opd functions other approaches for modification are possible. For example, variations in optical power with respect to gaze angle as computed by the simulation may be used to modify the curvature (second derivative) of the opd functions of the plates at coordinate locations corresponding to the measurements of optical power with respect to gaze angle. However, it should be noted that in such approaches it is important that the opd function remains smooth and continuous, at least up to the curvature terms of the opd function. By using representations that are necessarily smooth and continuous to the required order such continuity is ensured. For example, a non-uniform rational B-spline (NURBS) of third order or higher will have the necessary continuity so long as the knot locations are non-degenerate. Interpolation can also be used to ensure the necessary continuity.

The process of computing performance followed by modifying the opd functions of the system may be repeated a number of times to iteratively improve the performance of the system.

Figure 4:
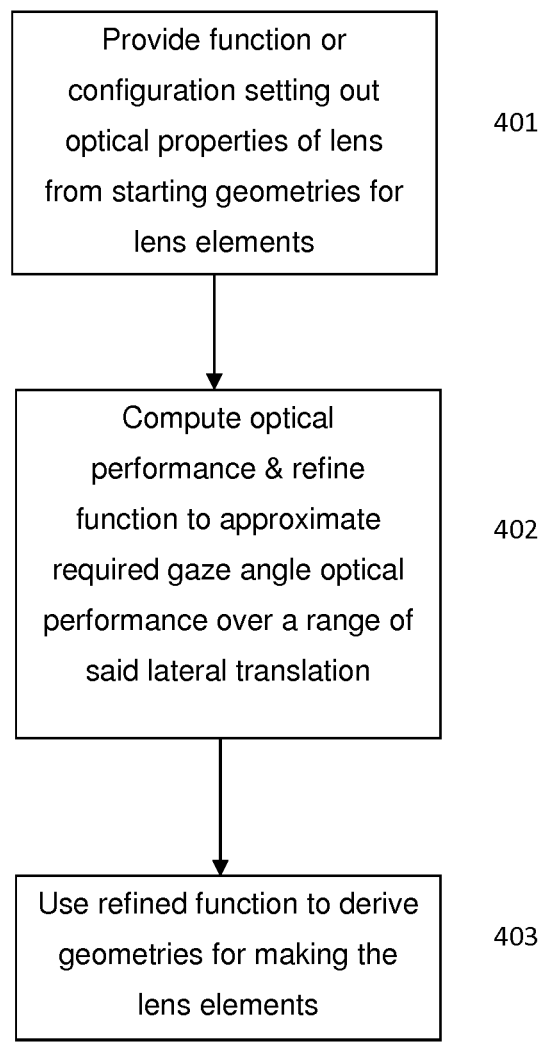
FIG. 4 is a flow diagram showing steps of the method of the present invention.

After reaching a function which produces the required optical performance, the geometries of the lens elements are calculated at step 403 of FIG. 4. Once the geometries have been calculated the lens elements can be manufactured.

Detailed Method

The present invention provides adjustable refractive optical devices based on moving elements with improved optical performance for viewing through the device over a wide range of directions such as is required for application as an adjustable power corrective lens in eyeglasses. In the prior art work the moving elements of the optical devices exhibit a variation of optical path difference curvature terms (second derivative of opd function) as measured with respect to movement of the elements that have the same magnitude as each other but opposite sign. An essential feature of the present invention is that the magnitude of variation of the optical path difference curvature terms as measured with respect to movement of the elements is generally different for each of the separate moving elements. The difference takes into account gaze angle effects. By appropriate configuration of the variation in optical path difference curvature terms it is possible to realise an adjustable optical device with superior optical performance. With respect to application to corrective lenses for eyeglasses, both distortion and variations in optical power with respect to gaze angle through the lens are generally undesirable. Furthermore, variations in optical power are a cause of distortion so minimizing these will also help minimize any distortion perceived when viewing through the present invention.

In a set of preferred embodiments the lens or optical device is composed of a pair of transparent refractive optical plates or lens elements, comprising a front plate 13 and a rear plate 12 arranged to lie one after another along a central viewing axis 14 and configured so as to lie substantially perpendicular to a central viewing axis, as shown in FIG. 2A. The system is intended for viewing by an observer with the rear plate placed nearest to the observer's eye. The observer can then look through the plates at some target scene with the plates providing refractive modification of light passing there through. This configuration will be familiar to those skilled in the art as observation through a refractive optical device, such as a conventional single-vision lens. The shape of the plates may be described using a Cartesian system of coordinates where the direction of the z-axis is defined to lie along the central viewing axis 14 and the x-axis and y-axis therefore lie in a plane approximately parallel to the optical plates. The origin of the x-axis and y-axis is defined to lie on the central viewing axis. The shape of the optical plates can now be described with reference to this coordinate system.

It should be noted that small tilts of the lens system with respect to the central viewing axis may be employed. For example, in eyeglasses it is common to rotate the lenses slightly to better wrap around the face of an individual by an amount determined from the face-form angle, and to tilt the lenses slightly forward, from the point of view of the wearer, by an amount determined by the pantoscopic tilt. A geometric transformation is sufficient to relate coordinates between the frame of reference of an observer and the frame of reference of the tilted optical system. For the sake of clarity such a transformation is omitted from the descriptions provided herein.

The front plate 21 has a thickness defined by the function $t_{13}(x,y)$ and is composed of a transparent material with refractive index $n_{13}$, the rear plate 24 has a thickness defined by the function $t_{12}(x,y)$ and is composed of a transparent material with refractive index $n_{12}$. The present invention may be configured in a number of embodiments and using any materials with some degree of transparency, irrespective of refractive index. Furthermore, the optical plates need not be restricted to be composed of the same material or even of a material of constant refractive index. The optical path length is defined by taking into account the physical path length and the refractive index along the path. The invention is therefore described in terms of the optical path difference (opd) function of the plates as this provides a more complete description of the invention than reference to the thickness function of the plates. The opd function of each plate is defined from the thickness of the plates assuming propagation along the z-axis direction and is therefore $$\phi_{13}(x,y)=(n_{13}-1)t_{13}(x,y), \quad (2)$$

for the front plate, and $$\phi_{12}(x,y)=(n_{12}-1)t_{12}(x,y), \quad (3)$$

for the rear plate. Thus it is possible to recover the thickness of an optical plate from the corresponding opd function and the refractive index of the material of the plate.

The total optical path difference φ of the optical device when the plates are stacked and viewed along the central axis and assuming zero deviation in view direction deviation due to refraction is therefore $$\phi(x,y)=\phi_{13}(x,y)+\phi_{12}(x,y). \quad (4)$$

If the front plate is translated in the positive x-direction by a distance $d_{13}$ and the rear plate is translated in the negative x-direction by a distance $d_{12}$ then the total optical path difference becomes $$\phi(x,y)=\phi_{13}(x-d_{13},y)+\phi_{12}(x+d_{12},y). \quad (5)$$

It is well known by those skilled in the art that for a thin lens system the focussing power associated with such an optical path difference function may be computed by evaluating the curvature terms of the opd with respect to coordinates orthogonal to a view direction, which for central viewing are the (x,y) axes as defined here. The resulting opd curvature terms are thus given by the derivatives $$\frac{\partial^2 \varphi_{12}}{\partial x^2}, \frac{\partial^2 \varphi_{12}}{\partial y^2}, \frac{\partial^2 \varphi_{12}}{\partial x \partial y}$$

for the rear optical plate, $$\frac{\partial^2 \varphi_{13}}{\partial x^2}, \frac{\partial^2 \varphi_{13}}{\partial y^2}, \frac{\partial^2 \varphi_{13}}{\partial x \partial y}$$

for the front optical plate, and $$\frac{\partial^2 \varphi}{\partial x^2}, \frac{\partial^2 \varphi}{\partial y^2}, \frac{\partial^2 \varphi}{\partial x \partial y}$$

for the total optical path difference and which is simply the sum of contributions from the individual lens elements. For the sake of clarity and convenience the curvature terms may be defined using a more compact notation; let the curvature terms as a function of (x,y) coordinates for the rear plate be written as $C_{xx}^{12}(x,y)$, $C_{yy}^{12}(x,y)$, $C_{xy}^{12}(x,y)$, where $$C_{xx}^{12}(x, y) = \frac{\partial^2 \varphi_{12}}{\partial x^2}\bigg|_{x,y}, C_{yy}^{12}(x, y) = \frac{\partial^2 \varphi_{12}}{\partial y^2}\bigg|_{x,y}, \quad (6)$$

$$C_{xy}^{12}(x, y) = \frac{\partial^2 \varphi_{12}}{\partial x \partial y}\bigg|_{x,y},$$

and similarly let the curvature terms as a function of (x,y) coordinates for the front plate be written as $C_{xx}^{13}(x,y)$, $C_{yy}^{13}(x,y)$, $C_{xy}^{13}(x,y)$, where $$C_{xx}^{13}(x, y) = \frac{\partial^2 \varphi_{13}}{\partial x^2}\bigg|_{x,y}, C_{yy}^{13}(x, y) = \frac{\partial^2 \varphi_{13}}{\partial y^2}\bigg|_{x,y}, \quad (7)$$

$$C_{xy}^{13}(x, y) = \frac{\partial^2 \varphi_{13}}{\partial x \partial y}\bigg|_{x,y},$$

An important feature of the present invention is that it provides for good optical performance to be achieved by using opd functions for the individual plates that combine to minimise the variation in the total optical path difference curvature terms as a function of view direction, or gaze angle, and as the plates are moved relative to one another along the prescribed trajectory. This is particularly relevant for applications where viewing through the device is required over a wide range of directions as is typically required for corrective eyewear.

The present invention allows for movement of one or both of the optical plates along an adjustment trajectory specified by ξ. A convenient way to specify a trajectory corresponding to translation of the plates is in terms of a parameter s where the (x,y,z) coordinates of points along the trajectory are then specified as functions of the parameter s:

$$x=\hat{x}(s), y=\hat{y}(s), z=\hat{z}(s). \quad (8)$$

Here s may be any parameterization including but not limited to arc length. Setting $\hat{z}(s)=0$, an opd function that is translated along ξ parameterized by s is therefore represented by the following transformation:

$$\phi(x,y) \to \phi(x-\hat{x}(s), y-\hat{y}(s)). \quad (9)$$

By way of example only the opd function for an optical device where the plates move in opposite directions along the same trajectory ξ parameterized by s is given by:

$$\phi(x,y)=\phi_{13}(x-\hat{x}(s), y-\hat{y}(s))+\phi_{12}(x+\hat{x}(s), y+\hat{y}(s)). \quad (10)$$

It should be noted that the trajectory for the movement of each plate need not be the same.

A general aspect of the invention is that the magnitudes of the derivatives of the opd curvature terms along the direction of the trajectory ξ are generally different for the two plates when measured at the same coordinates. This may be expressed with respect to a parameterization by s of ξ by taking the derivative with respect to s of the opd curvature terms at some reference point specified by $s_0$ and as represented by the differential operator $$\frac{d}{ds}\bigg|_{s_0}.$$

Thus in general the magnitude of the derivatives of the corresponding order curvature terms of the different surfaces when taken with respect to the parameter s at some reference value $s_0$ are not equal (except at trivial points where terms are zero):

$$\text{abs}\frac{dC_{xx}^{12}(x, y)}{ds}\bigg|_{s_0} \neq \text{abs}\frac{dC_{xx}^{13}(x, y)}{ds}\bigg|_{s_0},$$

$$\text{abs}\frac{dC_{xx}^{12}(x, y)}{ds}\bigg|_{s_0} \neq \text{abs}\frac{dC_{yy}^{13}(x, y)}{ds}\bigg|_{s_0},$$

$$\mathrm{abs}\frac{dC_{xx}^{12}(x,y)}{ds}\bigg|_{s_0} \neq \mathrm{abs}\frac{dC_{xy}^{13}(x,y)}{ds}\bigg|_{s_0},$$

where the function 'abs' denotes taking the absolute value of the input to the function. These derivatives may be performed at any point along the trajectory, but it should be noted that the comparison applies for the same point for each of the derivatives. It is often convenient but not necessary to perform such differentiation in the neutral position, where the plates have not been moved.

The alteration to the variation of the curvature of the opd functions of the optical plates is a significant difference to the prior art work where the derivatives of the opd curvatures with respect to the adjustment trajectory have equal magnitude and opposite sign. The allowance of more general forms for the variation of opd curvature of the optical plates with respect to the adjustment trajectory is of fundamental importance to the realisation of better optical performance when configuring an embodiment of the optical device for a particular application.

In one set of embodiments the transparent refractive optical plates are constrained to move along the direction of the x-axis only and the opd function of the plates is given by $$\varphi_{12}(x,y) = \alpha\left(\frac{1}{3}x^3 + xy^2\right) - \beta_{12}x + F_{12}(x,y) + G_{12}(y) + C_{12}, \quad (11)$$

for the rear plate; and $$\varphi_{13}(x,y) = k\left[\alpha\left(\frac{1}{3}x^3 + xy^2\right)\right] + \beta_{13}x + F_{13}(x,y) + G_{13}(y) + C_{13}, \quad (12)$$

for the front plate. The constant α is chosen to dictate the sensitivity of the power variation of the optical device to movement of the plates. The overall power range of the optical device is then determined by this sensitivity and the range of travel of the optical plates. The constants $\beta_{12}$, $C_{12}$, $\beta_{13}$, and $C_{13}$ are used to control the thickness of each of the plates. The functions $F_{12}(x,y)$ and $F_{13}(x,y)$ are arbitrary polynomial functions in (x,y) of second order or lower. The functions $G_{12}(y)$ and $G_{13}(y)$ are arbitrary functions of the y-coordinate only. Some or all of the terms following the $\frac{1}{3}x^3 + xy^2$ term may be used depending on the desired simulation complexity and improvement required.

Figure 5:
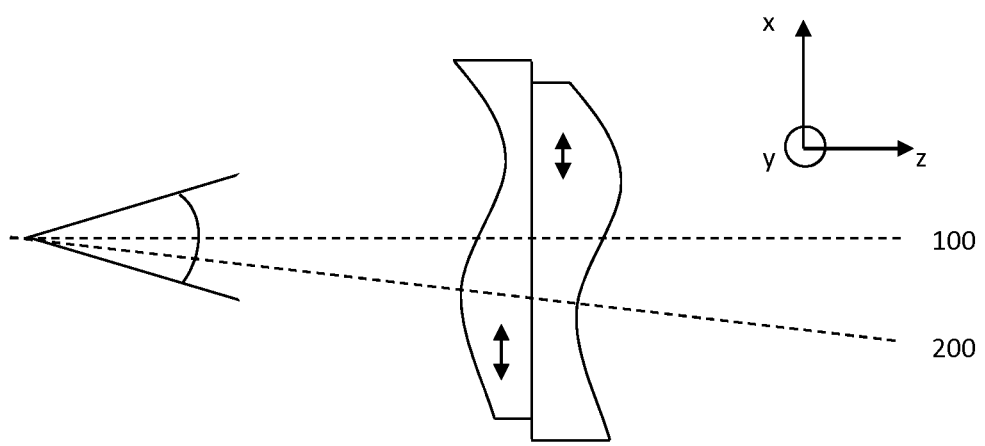
FIG. 5 is a schematic side view of a lens configuration with parameter k set to −1 and the lens elements moved away from the neutral position.

In this set of embodiments the constant k has a negative value that is not equal to −1 and is preferably in the range −1.5 to −1.01 or −0.99 to −0.5. For the sake of comparison in the prior art described herein the constant k is essentially defined to have a value of −1 only. In terms of the shape of the two plates, setting k to be equal to −1, $\beta_{12}=\beta_{13}$, $F_{12}(x,y)=-F_{13}(x,y)$, and $G_{12}(y)=-G_{13}(y)$ sets the plates to be of equal shape but one is oriented with thickness in reverse to the other such as shown in FIG. 5.

Figure 6A:
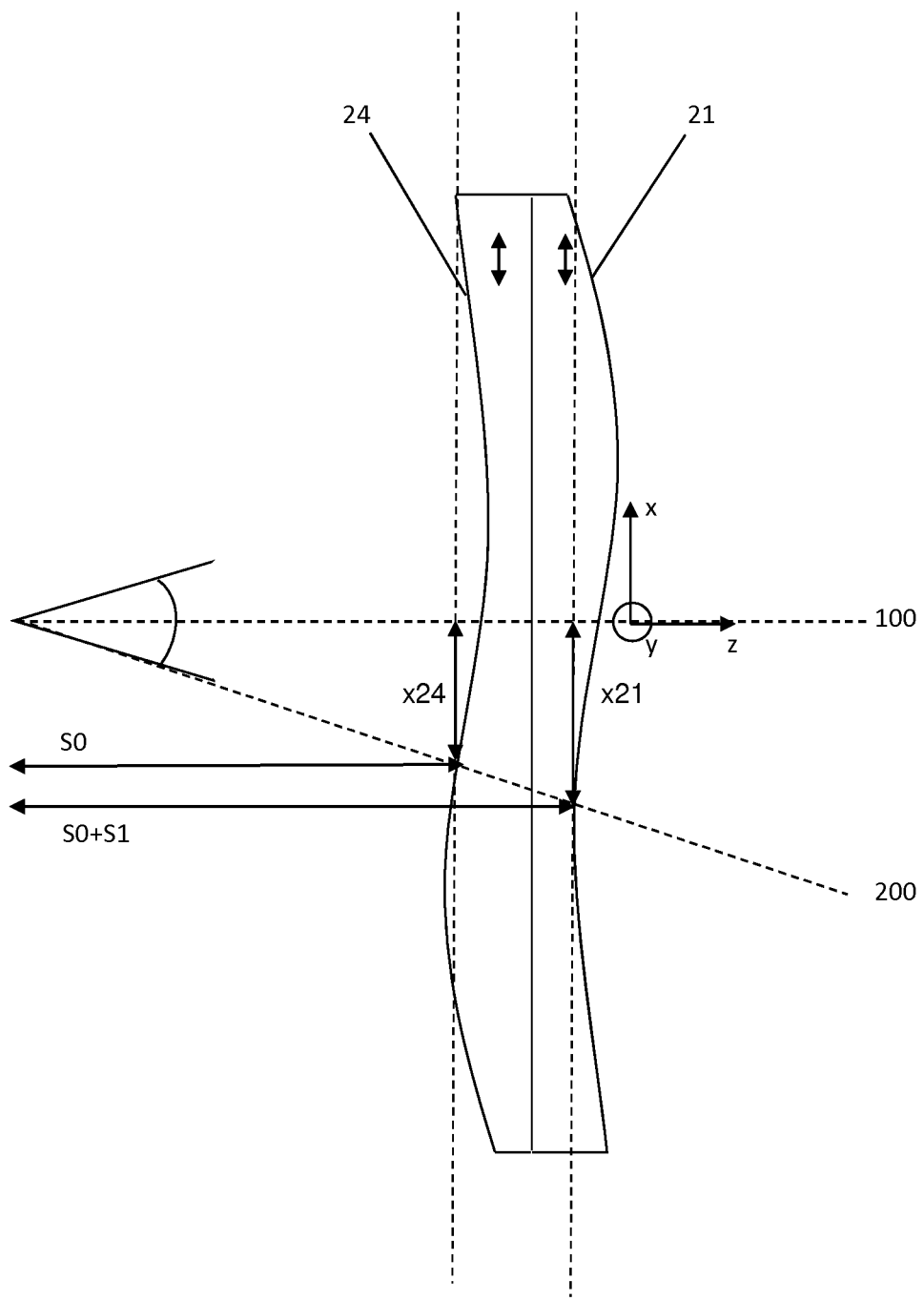
FIG. 6A is a detailed schematic view of the lens configuration of FIG. 5 with the lens elements set to the neutral position.

In the present invention the value of the constant k is chosen to give improved optical performance over a required power range and as determined by the particular mode of use for the optical device. In particular for application as a corrective lens in eyeglasses minimizing distortion and reducing variation of optical power and astigmatism with viewing angle when such an optical device is correctly oriented with respect to an eye is important for good optical performance. A value of k=−0.99 to k=−0.7 will usually give the best performance for embodiments of the present invention. An illustration of adjusting the value of k is shown in FIGS. 7A and 7B. With reference to FIG. 1 the front optical plate 13 and the rear optical plate 12 are arranged to lie substantially perpendicular to a central viewing axis 14 as seen by an observer 11. A Cartesian coordinate system is defined with the z-axis coincident with the central viewing axis. FIGS. 2A and 2B show two configurations for viewing through the invention. FIG. 2A shows a side view of the central viewing configuration in the absence of refractive shifts it can be seen that the (x,y) coordinates of the intersection of the gaze direction with surfaces 21, 22, 23 and 24 is the same and is located at (0,0). In FIG. 2B the gaze angle has shifted from the central axis by an angle of θ. This is shown in more detail in FIGS. 6A and 6B. For example, FIG. 6A shows that for viewing along the central viewing axis 100, the optical path intersects both plates at the coordinate (0,0). However, when the viewing axis changes to an off-axis gaze angle 200, the optical path intersects the pupil-side plate at a distance $x_{24}$ from the origin and intersects the object-side plate at a distance $x_{21}>x_{24}$ from the origin. The result is that for optical plates of non-zero thickness and separation the coordinates of where the gaze direction intersects with the surfaces is no longer the same. It is therefore not correct to combine the optical path differences in the manner indicated in equation 5 described herein since this equation assumes the same (x,y) coordinates for the two plates. If one neglects refractive bending of a ray coincident with the gaze direction 200 and one assumes that the rotation is in the xz-plane, then if the centre of rotation for observer 11 is located a distance $s_0$ from surface 24 and $s_0+s_1$ from surface 21 then the x-coordinate of the ray intersection of the gaze direction with surface 21 is given by $$x_{21} = x_{24}\left(1 + \frac{s_1}{s_0}\right)$$

where $x_{24}$ is the x-coordinate of the ray intersection with surface 24. If k=−1, as in the prior art cases, then a difference of opd curvature of $$\frac{2s_1}{s_0}\alpha x_{24}$$

will be generated in the expression for $$\frac{\partial^2 \varphi}{\partial x^2} \text{ and } \frac{\partial^2 \varphi}{\partial y^2},$$

because of the difference in coordinate position, with a resulting degradation in optical performance. Correction of optical effects with gaze angle may be taken further by assuming that the plate elements 12, 13 have no gap between them, are essentially flat and are composed of a medium of refractive index n. This may be achieved under these circumstances if k is given by:

$$k = -1 \bigg/ \left(1 + \frac{s_1}{ns_0}\right).$$

Figure 6B:
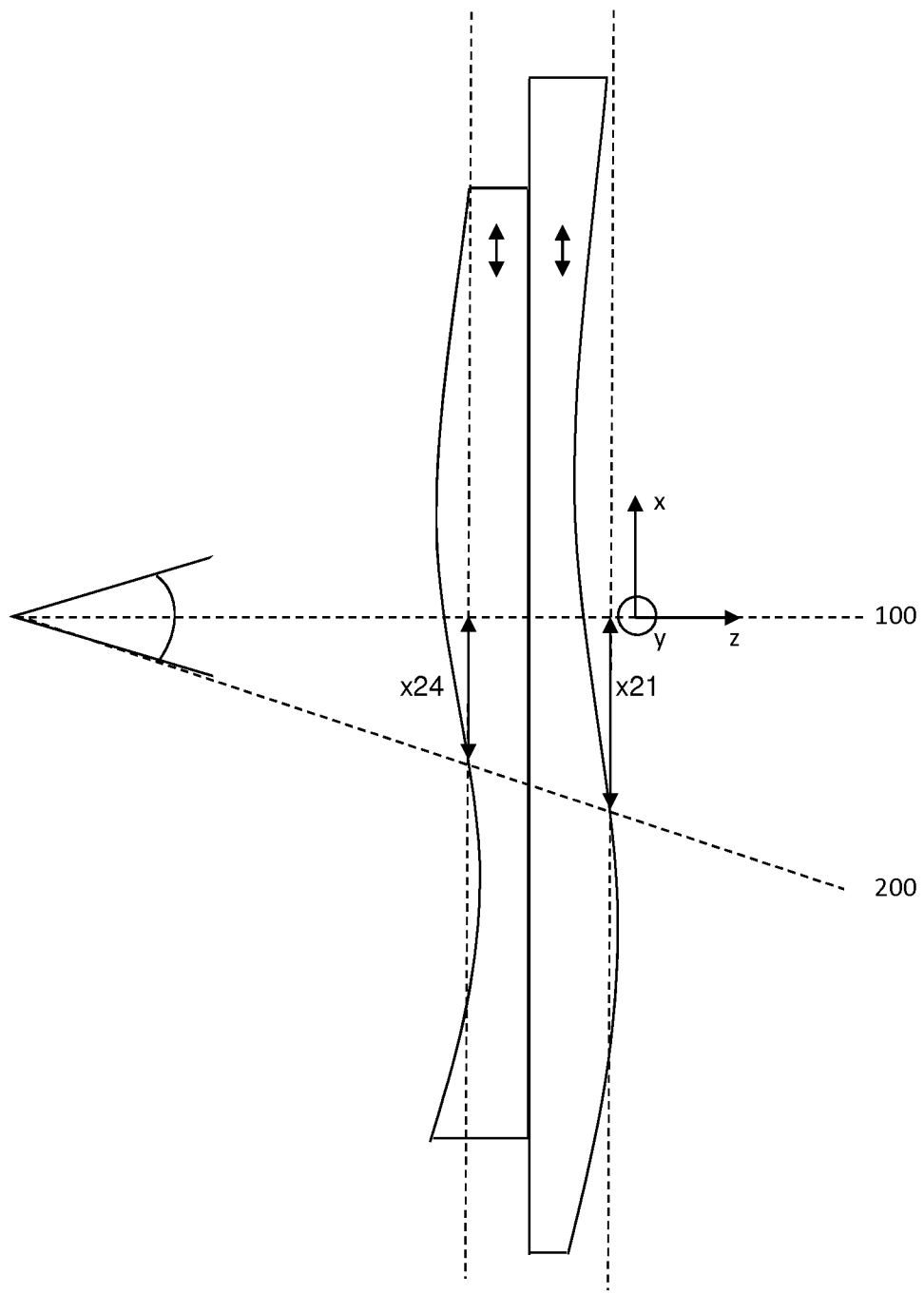
FIG. 6B is a detailed schematic view of the lens configuration the present invention with the lens elements set to the neutral position and the parameter k set to a negative value with magnitude less than unity.

FIG. 6B shows the object-side plate 13 expanded or stretched with the variation in curvature reduced by a factor k to achieve the correct curvature and optical power where the off-axis gaze angle intersects the object-side plate.

In a further embodiment, consideration of the change in optical power of a wavefront with propagation distance suggests introduction of a term $$\left(\frac{1}{12}x^4 + \frac{1}{2}x^2y^2\right)$$

into the opd function can give superior optical performance when appropriately configured. As such in one set of embodiments the transparent refractive optical plates are constrained to move along the direction of the x-axis only and the opd of the plates is given by $$\varphi_{12}(x, y) = \alpha\left(\frac{1}{3}x^3 + xy^2\right) + \tag{13}$$

$$\gamma_{12}\left(\frac{1}{12}x^4 + \frac{1}{2}x^2y^2\right) - \beta_{12}x + F_{12}(x, y) + G_{12}(y) + C_{12},$$

for the rear plate; and $$\varphi_{13}(x, y) = k\left[\alpha\left(\frac{1}{3}x^3 + xy^2\right)\right] + \tag{14}$$

$$\gamma_{13}\left(\frac{1}{12}x^4 + \frac{1}{2}x^2y^2\right) + \beta_{13}x + F_{13}(x, y) + G_{13}(y) + C_{13},$$

for the front plate. As above, the constant α is chosen to dictate the sensitivity of the power variation of the optical device to movement of the plates, and the constants $\beta_{12}$ and $\beta_{13}$ are used to control the thickness of the plate. The functions $F_{12}(x,y)$ and $F_{13}(x,y)$ are arbitrary polynomial functions in (x,y) of second order or lower. The functions $G_{12}(y)$ and $G_{13}(y)$ are arbitrary functions of the y-coordinate only. In this set of embodiments the constant k has a negative value preferably in the range −1.5 to −0.5 if either or both of $\gamma_{12}$ and $\gamma_{13}$ is non-zero. The value of the constant k is chosen to give improved optical performance over a required power range, in particular reducing variation of optical power and astigmatism with viewing angle and depends on the arrangement of the lens system relative to the eyeball viewing the system. A value of k=−0.99 to k=−0.7 or k in the range 0.99 to 0.9 will usually give the best performance for embodiments of the present invention.

The values of $\gamma_{12}$ and $\gamma_{13}$ are chosen so as to give improved optical performance over a required power range and as determined by the particular mode of use for the optical device. In particular for application as a corrective lens in eyeglasses minimizing distortion and reducing variation of optical power and astigmatism with viewing angle when such an optical device is correctly oriented with respect to an eye is important for good optical performance.

In one set of embodiments the transparent refractive optical plates are constrained to move along the direction of the x-axis only and the opd of the plates is given by $$\varphi_{12}(x, y) = \alpha\left(\frac{1}{3}x^3 + xy^2\right) + \gamma_{12}\left(\frac{1}{12}x^4 + \frac{1}{2}x^2y^2\right) - \beta_{12}x + F_{12}(x, y) + \tag{15}$$
$$G_{12}(y) + C_{12} + \varepsilon_{12}x^5 + \zeta_{12}x^3y^4 + \kappa_{12}x^4y^2 + \nu_{12}x^4y^2 + \eta_{12}x^4y^4,$$
if $x \geq 0$, and $$\varphi_{12}(x, y) = \alpha\left(\frac{1}{3}x^3 + xy^2\right) + \gamma_{12}\left(\frac{1}{12}x^4 + \frac{1}{2}x^2y^2\right) - \beta_{12}x + F_{12}(x, y) + \tag{16}$$
$$G_{12}(y) + C_{12} + \varepsilon'_{12}x^5 + \zeta'_{12}x^3y^4 + \kappa'_{12}x^4y^2 + \nu'_{12}x^4y^2 + \eta'_{12}x^4y^4,$$
if $x < 0$, for the rear plate: and $$\varphi_{13}(x, y) = \tag{17}$$
$$k\left[\alpha\left(\frac{1}{3}x^3 + xy^2\right)\right] + \gamma_{13}\left(\frac{1}{12}x^4 + \frac{1}{2}x^2y^2\right) + \beta_{13}x + F_{13}(x, y) +$$
$$G_{13}(y) + C_{13} + \varepsilon_{13}x^5 + \zeta_{13}x^3y^4 + \kappa_{13}x^4y^2 + \nu_{13}x^4y^2 + \eta_{13}x^4y^4,$$
if $x \geq 0$, and $$\varphi_{13}(x, y) = \tag{18}$$
$$k\left[\alpha\left(\frac{1}{3}x^3 + xy^2\right)\right] + \gamma_{13}\left(\frac{1}{12}x^4 + \frac{1}{2}x^2y^2\right) + \beta_{13}x + F_{13}(x, y) +$$
$$G_{13}(y) + C_{13} + \varepsilon'_{13}x^5 + \zeta'_{13}x^3y^4 + \kappa'_{13}x^4y^2 + \nu'_{13}x^4y^2 + \eta'_{13}x^4y^4,$$
if $x < 0$, for the front plate. Again, the constant α is chosen to dictate the sensitivity of the power variation of the optical device to movement of the plates. The constants $\beta_{12}$ and $\beta_{13}$ are used to control the thickness of the plate. The functions $F_{12}(x,y)$ and $F_{13}(x,y)$ are arbitrary polynomial functions in (x,y) of second order or lower. The functions $G_{12}(y)$ and $G_{13}(y)$ are arbitrary functions of the y-coordinate only. In this set of embodiments the constant k has a negative value that is not equal to −1 and is preferably in the range −1.5 to −1.01 or −0.99 to −0.5. For the sake of comparison in the prior art described heretofore the constant k is essentially defined to have a value of −1 only. The value of the constant k is chosen to give improved optical performance, in particular reducing variation of optical power and astigmatism with viewing angle and depends on the arrangement of the lens system relative to the eyeball viewing the system. A value of k between −0.99 and −0.7 will usually give the best performance over a required power range for embodiments of the present invention. As with the value of k the values of the fixed coefficients $\gamma_{12}, \gamma_{13}, \varepsilon_{12}, \varepsilon_{13}, \zeta_{12}, \zeta_{13}, \kappa_{12}, \kappa_{13}, \nu_{12}, \nu_{13}, \eta_{12}, \eta_{13}, \varepsilon'_{12}, \varepsilon'_{13}, \zeta'_{12}, \zeta'_{13}, \kappa'_{12}, \kappa'_{13}, \nu'_{12}, \nu'_{13}, \eta'_{12},$ and $\eta'_{13}$ are chosen so as to give improved optical performance over a required power range and as determined by the particular mode of use for the optical device. In particular for application as a corrective lens in eyeglasses minimizing distortion and reducing variation of optical power and astigmatism with viewing angle when such an optical device is correctly oriented with respect to an eye is important for good optical performance.

In a set of preferred embodiments the transparent refractive optical plates are constrained to move along the direction of the x-axis. In this set of embodiments the variation of the opd curvature terms (as specified in the set of equations 6 and 7 herein) are described with respect to the direction of movement. As discussed heretofore the trajectory of motion may be described in a parametric fashion and thus variation of the opd curvature terms may be calculated using the operator $$\left.\frac{d}{ds}\right|_{s_0}$$

where $s_0$ is the reference position and s is the parameter describing the trajectory of motion. However, given that in this set of embodiments the direction of movement is aligned with one of the axes one may instead set the reference point to the origin of the plates aligned along the central viewing axis (the neutral position) and express the variation of curvature terms as an additional partial derivative step with respect to x. This yields the following sets of partial differential equations for the opd curvature terms of the plates:

$$\frac{\partial C_{xx}^{12}(x,y)}{\partial x} = \frac{\partial^3 \varphi_{12}}{\partial x^3} = 2\alpha[1 + J_{12}(x,y)], \quad (19)$$

$$\frac{\partial C_{yy}^{12}(x,y)}{\partial x} = \frac{\partial^3 \varphi_{12}}{\partial x \partial y^2} = 2\alpha[1 + K_{12}(x,y)], \quad (20)$$

$$\frac{\partial C_{xy}^{12}(x,y)}{\partial x} = \frac{\partial^3 \varphi_{12}}{\partial x^2 \partial y} = 2\alpha L_{12}(x,y), \quad (21)$$

for the rear plate; and $$\frac{\partial C_{xy}^{13}(x,y)}{\partial x} = \frac{\partial^3 \varphi_{13}}{\partial x^3} = -2\alpha[1 + J_{13}(x,y)], \quad (22)$$

$$\frac{\partial C_{xy}^{13}(x,y)}{\partial x} = \frac{\partial^3 \varphi_{13}}{\partial x \partial y^2} = -2\alpha[1 + K_{13}(x,y)], \quad (23)$$

$$\frac{\partial C_{xy}^{13}(x,y)}{\partial x} = \frac{\partial^3 \varphi_{13}}{\partial x^2 \partial y} = -2\alpha L_{13}(x,y), \quad (24)$$

for the front plate. In equations 19-24 $\alpha$ is a constant and $J_2(x,y)$, $J_{13}(x,y)$, $K_{12}(x,y)$, $K_{13}(x,y)$, $L_{12}(x,y)$ and $L_{13}(x,y)$ are dimensionless functions of the (x,y) plate coordinates.

The opd functions for the front and rear optical plates may be determined by solution of these partial differential equations. Due to the third order nature of the partial derivatives means that polynomial terms in (x,y) of combined order less than 3 or with no dependence on x cannot be expressed in equations 19-24 and so must be specified separately or derived by another approach. This includes terms such as $\beta_{12}x$, $\beta_{13}x$, $F_{12}(x,y)$, $F_{13}(x,y)$, $G_{12}(y)$, $G_{13}(y)$, $C_{12}$, and $C_{13}$ as they appear in equations 11-18. By way of example only the terms $\beta_{12}x$ and $\beta_{13}x$ may be added to the opd functions $\varphi_{12}$ and $\varphi_{13}$ respectively and the values of $\beta_{12}$, $\beta_{13}$ determined by minimizing the thickness of the optical plate described by the respective opd function over a chosen size and shape of optical plate. Although these terms may be added separately and independently from solutions to the partial differential equations 19-24 it will be appreciated by those skilled in the art that appropriate configuration of these terms may be performed as part of the processes described herein to generally determine the opd functions of the optical plates.

Owing to the coupling between the partial derivatives it is not possible in general to independently specify arbitrary functions simultaneously for all of the equations within the set for the rear plate opd, $J_{12}(x,y)$, $K_{12}(x,y)$, and $L_{12}(x,y)$. Likewise it is not possible to specify arbitrary functions simultaneously for each of the equations within the set describing partial derivatives of the front plate opd function, $J_{13}(x,y)$, $K_{13}(x,y)$, and $L_{13}(x,y)$. Only for certain cases will it be possible to exactly solve for $\varphi_{12}(x,y)$ and $\varphi_{13}(x,y)$ from the set of partial derivatives.

In another set of embodiments an alternative approach may be used whereby a solution for the opd functions $\varphi_{12}(x,y)$ and $\varphi_{13}(x,y)$ is sought that approximates the values of the partial derivatives given in equations 19-24, but does not equal them exactly. In this set of embodiments an approximate solution is calculated using numerical methods familiar to those skilled in the art including but not limited to use of the finite element method and use of numerical techniques to minimize the difference between the partial derivatives arising from an approximate representation of the opd function and the target values for the partial derivatives in expressions 19-24. Suitable approximate representations of the opd function include but are not limited to Non-Uniform Rational B-Spline (NURBS) surfaces and polynomial representations including but not limited to representation as a series expansion of the Zernike polynomials of the plate coordinates.

When using a particular representation for the opd functions, minimization of the difference between the target values given in equations 19-24 and that attained by the actual opd functions $\varphi_{12}$, $\varphi_{13}$ is achieved by altering the values of parameters associated with the representation that control the shape produced by the representation. In the case of Zernike polynomials it is the values of the coefficients associated with each polynomial term that govern the overall shape; for NURBS surfaces it is the knot locations and control point coordinates. In this set of embodiments there is provided some choice over the minimization performed. In one approach the minimization is performed by evaluating the difference between that computed from the approximate representation at a series of discrete points across the optical plates and the partial derivatives from equations 19-21 or 22-24 evaluated at the same discrete points (depending on whether the opd function for the front plate or the rear plate is being calculated). By taking the sum of the absolute values of these differences a quantity suitable for minimization is computed. In an alternative approach the sum of the square of the values of the difference at each evaluation point may be computed and minimized. In another approach at each evaluation point the difference between the partial derivatives evaluated by the equations 19-21 or 22-24 and the partial derivatives computed from the approximate representation is multiplied by a weighting factor depending on the location of the evaluation point. In this way a greater emphasis can be given to calculation of optical performance over some region, such as near the central viewing region of a lens, which is typically the most important part of a lens if used as the corrective lens in eyeglasses. The minimization itself may be performed using a variety of methods familiar to those skilled in the art including but not limited to Newton's method, conjugate gradient methods, the Simplex algorithm, simulated annealing, and genetic algorithms.

The present invention provides for another set of embodiments which uses the representation in equations 19-24 for the partial derivatives of the opd function of the front and rear optical plates. In this set of embodiments an exact or approximate solution to the partial derivatives is determined using techniques familiar to those skilled in the art and disclosed heretofore. In this set of embodiments the functions $J_{12}(x,y)$, $J_{13}(x,y)$, $K_{12}(x,y)$, $K_{13}(x,y)$, $L_{12}(x,y)$ and $L_{13}(x,y)$ are adapted iteratively in response to the output of an optical simulation of the device. Such optical simulation may be performed by computational techniques familiar to those skilled in the art including but not limited to ray tracing and numerically solving the classical wave equation for the optical system. Outputs generated by the optical simulation could include but are not limited to calculation of optical power with respect to gaze direction, calculation of astigmatism with respect to gaze direction, calculation of distortion with respect to gaze direction and overall thickness of the optical device. In order to achieve good optical performance over the required range of adjustment simulations may be performed for a number of reference positions of the optical plates, as shifted with respect to each other along the x-axis and the overall performance of the device determined from a combination of the performance achieved at each reference position.

The functions $J_{12}(x,y)$, $J_{13}(x,y)$, $K_{12}(x,y)$, $K_{13}(x,y)$, $L_{12}(x,y)$ and $L_{13}(x,y)$ may be represented in a number of ways, including but not limited to numerical values on a grid of coordinates, Non-Uniform Rational B-Spline surfaces and polynomial representations including but not limited to representation as a series expansion of the Zernike polynomials of the plate coordinates. Within the set of embodiments an approach for alteration of the functions $J_{12}(x,y)$, $J_{13}(x,y)$, $K_{12}(x,y)$, $K_{13}(x,y)$, $L_{12}(x,y)$ and $L_{13}(x,y)$ to achieve good optical performance may proceed by optimization by minimization of a scalar merit function. Here the scalar merit function is a computation producing a single scalar value determined from a sum of values computed from the aggregate of simulation data after this data has been measured against a set of desirable and undesirable criteria. The value of this quantity represents the extent to which the targets for optical performance of the plates are being achieved. The variables altered in order to minimise the scalar merit function are the parameters governing the shapes described for the representations of the functions $J_{12}(x,y)$, $J_{13}(x,y)$, $K_{12}(x,y)$, $K_{13}(x,y)$, $L_{12}(x,y)$ and $L_{13}(x,y)$. The minimization may be performed by a variety of techniques familiar to those skilled in the art including but not limited to Newton's method, conjugate gradient methods, the Simplex algorithm, simulated annealing, and genetic algorithms. In another approach within this set of embodiments direct manipulation of data from the optical simulation is used to modify the functions $J_{12}(x,y)$, $J_{13}(x,y)$, $K_{12}(x,y)$, $K_{13}(x,y)$, $L_{12}(x,y)$ and $L_{13}(x,y)$. In this approach a computation is performed using the outputs of the optical simulation to modify the functions $J_{12}(x,y)$, $J_{13}(x,y)$, $K_{12}(x,y)$, $K_{13}(x,y)$, $L_{12}(x,y)$ and $L_{13}(x,y)$. Such computations include but are not limited to simple steps such as multiplication, addition and subtraction and also include more sophisticated transformations such as taking derivatives, integrals or a nonlinear combination of several outputs from an optical simulation. It may be necessary to use intermediate steps to ensure that compatible representations are used for any computed modifications and the functions to which the modifications are applied. The goal of this process of modifying $J_{12}(x,y)$, $J_{13}(x,y)$, $K_{12}(x,y)$, $K_{13}(x,y)$, $L_{12}(x,y)$ and $L_{13}(x,y)$ is to make changes that will improve optical performance. Such modifications may be applied locally or globally, depending on the representation used.

The resulting opd functions derived from the modified functions $J_{12}(x,y)$, $J_{13}(x,y)$, $K_{12}(x,y)$, $K_{13}(x,y)$, $L_{12}(x,y)$ and $L_{13}(x,y)$, in conjunction with lower order terms described heretofore, may deliver acceptable optical performance. If acceptable performance is not achieved then it may be necessary to repeat the modification process iteratively over one or more steps to arrive at an acceptable level of optical performance.

It should be noted that the special case of $J_{12}(x,y)=K_{12}(x,y)=L_{12}(x,y)=L_{13}(x,y)=0$ and $J_{13}(x,y)=K_{13}(x,y)=-k-1$, results in opd functions of $$\varphi_{12}(x, y) = \alpha\left(\frac{1}{3}x^3 + xy^2\right), \text{ and} \quad (25)$$

$$\varphi_{13}(x, y) = k\alpha\left(\frac{1}{3}x^3 + xy^2\right), \quad (26)$$

for the rear plate (equation 25) and front plate (equation 26) respectively. These functions are consistent with the first term specified in equations 11-18.

The prior art works U.S. Pat. No. 3,305,294 and U.S. Pat. No. 7,338,159 also correspond to a special case where $J_{12}(x,y)=J_{13}(x,y)=K_{12}(x,y)=K_{13}(x,y)=L_{12}(x,y)=L_{13}(x,y)=0$. Consequently only non-zero expressions for $J_{12}(x,y)$, $J_{13}(x,y)$, $K_{12}(x,y)$, $K_{13}(x,y)$, $L_{12}(x,y)$ and $L_{13}(x,y)$ are within the scope of the invention.

The approach underlying the set of embodiments based on equations 19-24 may be generalised to form another set of embodiments where movement of the transparent refractive optical plates is constrained to be along a trajectory $\xi$ as parameterized by s rather than just along the x-axis. This set of embodiments is specified by derivatives of the opd curvature terms with respect to the parameter s at the specific reference point $s_0$ yields the following sets of equations:

$$\frac{d}{ds}\bigg|_{s_0} C_{xx}^{12}(x, y) = \frac{d}{ds}\bigg|_{s_0} \left[\frac{\partial^2 \varphi_{12}}{\partial x^2}\right] = 2\alpha[1 + M_{12}(x, y)], \quad (27)$$

$$\frac{d}{ds}\bigg|_{s_0} C_{yy}^{12}(x, y) = \frac{d}{ds}\bigg|_{s_0} \left[\frac{\partial^2 \varphi_{12}}{\partial y^2}\right] = 2\alpha[1 + N_{12}(x, y)], \quad (28)$$

$$\frac{d}{ds}\bigg|_{s_0} C_{xy}^{12}(x, y) = \frac{d}{ds}\bigg|_{s_0} \left[\frac{\partial^2 \varphi_{12}}{\partial x \partial y}\right] = 2\alpha Q_{12}(x, y), \quad (29)$$

for the rear plate; and $$\frac{d}{ds}\bigg|_{s_0} C_{xx}^{13}(x, y) = \frac{d}{ds}\bigg|_{s_0} \left[\frac{\partial^2 \varphi_{13}}{\partial x^2}\right] = -2\alpha[1 + M(x, y)], \quad (30)$$

$$\frac{d}{ds}\bigg|_{s_0} C_{yy}^{13}(x, y) = \frac{d}{ds}\bigg|_{s_0} \left[\frac{\partial^2 \varphi_{13}}{\partial y^2}\right] = -2\alpha[1 + N_{13}(x, y)], \quad (31)$$

$$\frac{d}{ds}\bigg|_{s_0} C_{xy}^{13}(x, y) = \frac{d}{ds}\bigg|_{s_0} \left[\frac{\partial^2 \varphi_{13}}{\partial x \partial y}\right] = -2\alpha Q_{13}(x, y), \quad (32)$$

for the front plate. The parameter $\alpha$ is a constant. In equations 27-32 $M_{12}(x,y)$, $M_{13}(x,y)$, $N_{12}(x,y)$, $N_{13}(x,y)$, $Q_{12}(x,y)$ and $Q_{13}(x,y)$ are dimensionless functions of the (x,y) plate coordinates. The purpose and behaviour of these functions is very similar to that of $J_{12}(x,y)$, $J_{13}(x,y)$, $K_{12}(x,y)$, $K_{13}(x,y)$, $L_{12}(x,y)$ and $L_{13}(x,y)$ as they appear in equations 19-24. As in the case of the set of embodiments based on solutions to equations 19-24, certain terms will not be expressed in the partial derivatives as they will have been differentiated to zero. Such terms may be added separately. It will be appreciated by those skilled in the art that it is possible to pursue the following sets of embodiments in analogy with those already disclosed heretofore for optical plates based on approaches that make use of equations of 19-24:

i) Direct solution of the two sets of partial differential equations 27-29 and 30-32 to determine the opd functions for the rear plate and front plate respectively.

ii) Generation of opd functions that approximately solve the partial differential equations 27-32 by using representations of the opd function including but not limited to Non-Uniform Rational B-Spline (NURBS) surfaces and polynomial representations including but not limited to representation as a series expansion of the Zernike polynomials of the plate coordinates. The parameters governing the representation are adjusted so that the partial derivatives of the approximate representation resemble the equations 27-32. A number of approaches may be used for determining the quality of an approximation including but not limited to computing the square of the sum of differences between the computed approximate results for equations 27-32 and the exact representation.

iii) Use of optical simulation to iteratively or otherwise optimize the functions $M_{12}(x,y)$, $M_{13}(x,y)$, $N_{12}(x,y)$, $N_{13}(x,y)$, $Q_{12}(x,y)$ and $Q_{13}(x,y)$ for good optical performance either by minimization of a defined scalar merit function or by direct manipulation of the simulation results to alter the functions $M_{12}(x,y)$, $M_{13}(x,y)$, $N_{12}(x,y)$, $N_{23}(x,y)$, $Q_{12}(x,y)$ and $Q_{13}(x,y)$.

Figure 7:
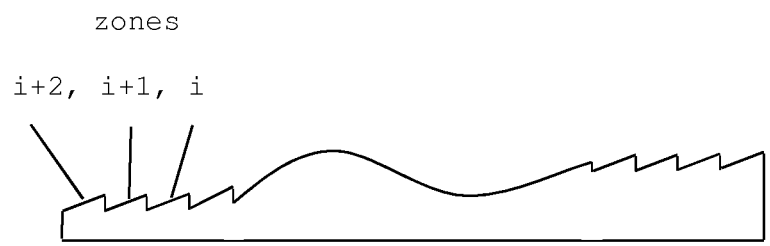
FIG. 7 is a schematic side view of lens element of an embodiment of the present invention including thickness reducing zones at the periphery of the lens element.

In a further set of embodiments the opd functions of the optical plates, which correspond to any of those described herein, are modified by dividing each of the plates into a series of zones where each zone is denoted by an index i for the rear plate and an index j for the front plate. An example cross-section showing how the rear plate might be configured is shown in FIG. 7. The zones are configured such that each zone is bordered on each side by another zone with a different index differing in value by one. The zones need not be closed within the optical plate or a region within the optical plate. That is, the zones do not need to form a closed loop around the lens element. This may be explained for the example of vision correction lenses because the side parts of the lens are often thicker than the top and bottom parts, so in this example zones could be employed at the sides only. Associated with each zone is a constant value $\psi_{12}^{(i)}$ for the rear plate and $\psi_{13}^{(j)}$ for the front plate. This opd function within each zone is then offset by these values to form new opd functions, $\phi'_{12}(x,y)$, $\phi'_{13}(x,y)$, according to the following equations:

$$\phi'_{12}(x,y)=\phi_{12}(x,y)-\psi_{12}^{(i)}+D_{12}, \quad (33)$$

for the rear plate and $$\phi'_{13}(x,y)=\phi_{13}(x,y)-\psi_{13}^{(j)}+D_{13}, \quad (34)$$

for the front plate. Here $D_{12}$ and $D_{13}$ are constants used to modify the overall thickness of the plates. In this set of embodiments the purpose of $\psi_{12}^{(i)}$ and $\psi_{13}^{(j)}$ is to keep the values of $\phi'_{12}(x,y)$, $\phi'_{13}(x,y)$ within a prescribed range, thus constraining the overall range of thickness of the optical plates. It will be familiar to those skilled in the art that such a modification to the optical plates will produce an adjustable refractive optical device analogous to Fresnel lenses. The index value of a particular (x,y) coordinate on the optical plates and the corresponding opd function offset values may be prescribed in a variety of ways including the following equations:

$$i = \text{floor}\left[\frac{\varphi_{12}(x,y) - E_{12}}{H_{12}}\right], \quad (35)$$

$$\psi_{12}^{(i)} = iH_{12}, \quad (36)$$

$$j = \text{floor}\left[\frac{\varphi_{13}(x,y) - E_{13}}{H_{13}}\right], \quad (37)$$

and $$\psi_{13}^{(j)} = jH_{13}. \quad (38)$$

Here $E_{12}$, $H_{12}$, $E_{13}$, $H_{13}$ are constants where $H_{12}$ and $H_{13}$ control the magnitude of the variations of the opd functions (and so the thickness variations of the plates) and $E_{12}$ and $E_{13}$ provide global control over the position of the zone boundaries. The function 'floor' returns the value of the lowest integer below or equal to the input to the function. In a particular subset of embodiments the values of $H_{12}$ and $H_{13}$ are chosen to be equal to a reference wavelength multiplied by a small integer value (typically less than 10). The resulting optical device would then be referred to as a diffractive optical device, in analogy to diffractive lenses familiar to those skilled in the art.

Within this set of embodiments it is also possible to define $E_{12}$, $H_{12}$, $E_{13}$, $H_{13}$ as well as $D_{12}$ and $D_{13}$ to have different values for different regions of the respective optical plates. By way of example only one use of such modifications would allow for progressive increase or decrease in the height of the thickness variations towards the periphery of the optical plates.

Figure 8:
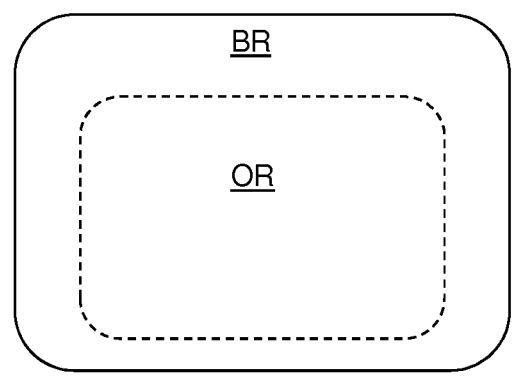
FIG. 8 is a schematic plan view of lens element of an embodiment of the present invention including a blending region at the perimeter of the lens element.

The present invention provides for the optical plates to feature two qualitatively distinct regions, as shown in FIG. 8. One region, designated the optical region OR, is used for optical viewing and will generally occupy a central region of the optical plates. The other region, designated the blending region BR, is not designed to give good optical performance and instead is shaped so as to satisfy constraints such as mechanical constraints on the lens edge thickness. The two regions are joined by specifying a common perimeter function and dictating a level of surface continuity between the functions, typically position, gradient and curvature continuity. The optical region is then used to determine the shape of the blending region in the vicinity at the perimeter, since it must maintain the demanded level of continuity. The blended region is then extrapolated from the perimeter of the optical region to another perimeter, typically the perimeter of the device where another set of continuity conditions are applied, typically position, gradient and curvature continuity. Multiple blending regions may be used to achieve more complicated shapes outside of the optical region.

Figure 9A:
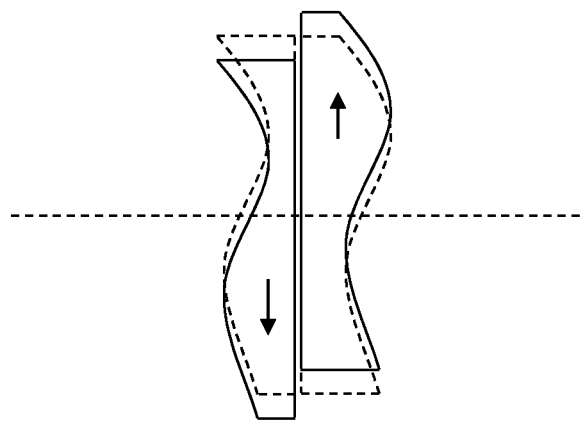
FIGS. 9A, 9B and 9C are figures comparing lens arrangements of the present invention.
Figure 9B:
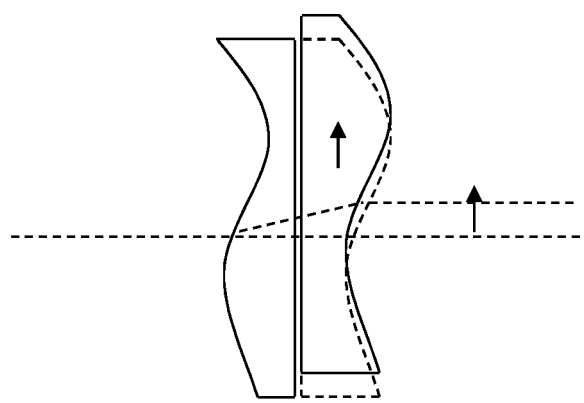
Figure 9C:
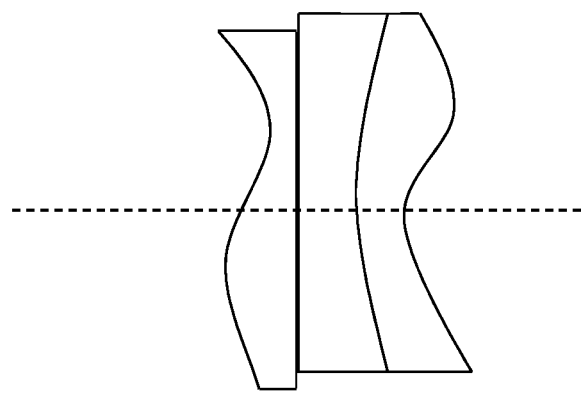

The present invention provides for an arbitrary configuration of relative movement of either plate including the possibility that one plate remains fixed. A configuration where only one plate is moved has advantages in a simpler drive mechanism for moving the plate to adjust optical power. However, if one plate remains fixed then changes in optical power by the device will also result in a shift of the central axis of the optical device as determined by the mid-point between the moving optical plates. Viewing through the lens along an axis shifted from this central axis will result in a prismatic shift in the direction being viewed, as shown in FIGS. 9A and 9B. This may be compensated by introducing into the moving surface an additional term that provides a variable prismatic compensation, for example as shown in FIG. 9C. For movement along the x-axis this may be achieved by adding the parabolic term $\mu x^2$ to the opd function of the moving surface. The value of $\mu$ may be chosen by selecting a power for the optical device at which zero prismatic shift is required. In general the change in power caused by a shift of the moving optical plate through a distance d may be described by a function $\Delta P(d)$. Zero prismatic shift after moving such an optical plate through a distance $d_0$ may then be achieved by setting $\mu=\Delta P(d_0)/2$. The focussing effects introduced by a prismatic correction term may be compensated by inclusion of a term with similar magnitude but opposite sign in the thickness function of the other optical plate.

In embodiments where one of the optical plates remains fixed it is possible to add an arbitrary additional opd function, H(x,y), which provides other refractive optical effects, including prescription correction or deliberate variations of optical power such as to provide a multifocal or bifocal aspect to the device. It is possible to add such an arbitrary additional opd function to embodiments where both plates moved, even though undesirable optical effects may result such as prism variation so long as these effects remain small enough to not severely compromise optical performance and visual function. It should be noted that an optical device configured to any of the embodiments will potentially require re-optimization upon the introduction of any such term. In a certain embodiment a fixed prescription such as an optical power and astigmatism correction may be applied to the fixed plate such as the front plate to provide basic optical power eyeglasses. Then, by adjusting the position of the rear plate, the power can be increased while maintaining the astigmatism or other correction.

It will be appreciated by those skilled in the art that a precise analysis and correction of gaze-direction dependent effects as well as the effects of propagation through the finite distance between refracting surfaces may be achieved by use of numerical simulation techniques such as raytracing to precisely compute the behaviour of an optical system. Such analyses may be readily performed using commercially available software packages such as ZEMAX (Radiant ZEMAX LLC, Bellevue, Wash., USA). It will be appreciated by those skilled in the art that such analysis techniques may be used to determine the optimal values of various parameters of the equations for the opd functions of the optical plates defined herein and where optimality of a set of parameters is determined subjectively according to a prescribed merit function. Typically a suitable merit function would look to score the optical power variation and the distortion of a lens as measurements of its quality however other quantities such as the thickness of the lens, may also be important. In combination with simulation approaches a more sophisticated correction of gaze direction dependent effects can be accounted for by the set of embodiments outlined according to equations 19-24 and equations 27-32. Suitable representations of the opd functions with sufficient degrees of freedom to describe the surfaces which would arise from such a numerical process include but are not limited to Non-Uniform Rational B-Spline surfaces and polynomial representations including but not limited to representation as a series expansion of the Zernike polynomials of the plate coordinates.

With reference to FIG. 1, in one embodiment of the invention the rear optical plate 12 is described by an opd function based on equation 11 and the front optical plate 13 is described by an opd function based on equation 12. The plates are constrained so that only movement along the x-axis is possible.

In another embodiment of the invention the rear optical plate 12 is described by an opd function based on equation 13 and the front optical plate 13 is described by an opd function based on equation 14. The plates are constrained so that only movement along the x-axis is possible.

In another embodiment of the invention the rear optical plate 12 is described by an opd function based on equations 15 & 16 and the front optical plate 13 may be described by an opd function based on equations 17 & 18. The plates are constrained so that only movement along the x-axis is possible.

In another embodiment of the invention the rear optical plate 12 is described by an opd function based on a solution of equations 19-21 and the front optical plate 13 may be described by an opd function based on equations 22-24. The plates are constrained so that only movement along the x-axis is possible.

In another embodiment of the invention the rear optical plate 12 is described by an opd function based on a solution of equations 27-29 and the front optical plate 13 may be described by an opd function based on equations 30-32. The plates are constrained so that only movement along a trajectory specified by $\xi$ is possible.

Figure 3A:
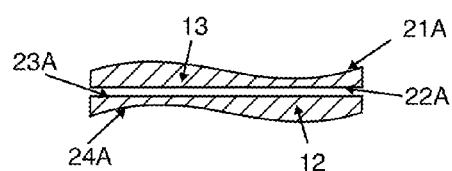
FIGS. 3A, 3B, 3C, 3D, 3E, 3F and 3G show cross-section views through the lens elements for different configurations of the invention.
Figure 3D:
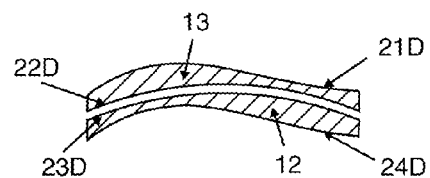
Figure 3B:
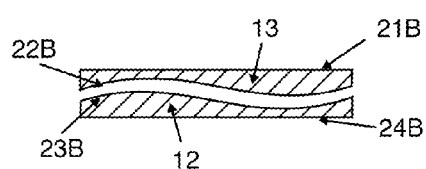
Figure 3E:
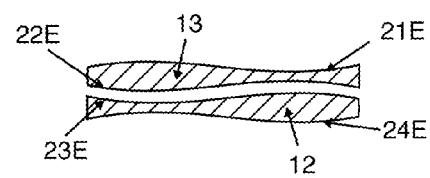
Figure 3C:
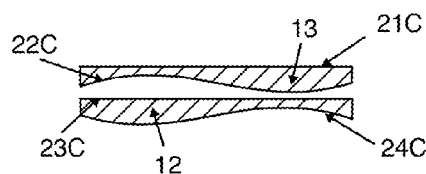
Figure 3F:
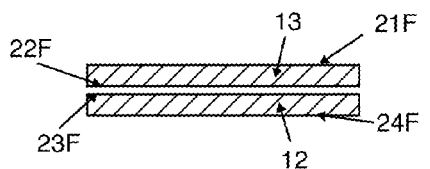
Figure 3G:
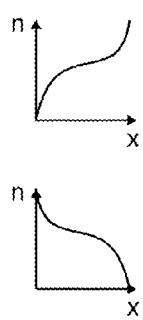
Figure 3G:
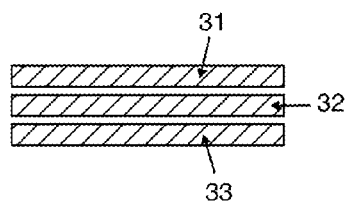

FIGS. 3A-3G show schematically a number of ways for configuring the invention. In all cases it is possible to recover thickness function from opd function and the refractive index of the material for an optical plate. This is important as it is the thickness function, in conjunction with the chosen configuration, which ultimately dictates the shape of the plate and this is what would be manufactured in a production setting. The equations described herein detail optical path differences for the optical plates. In FIG. 3A the outward facing surfaces 21A and 24A of optical plates 13 and 12 respectively incorporate the thickness variations to generate the optical path differences. Surfaces 23A and 24A remain flat. In FIG. 3B the inner facing surfaces 22B and 23B incorporate the thickness variations to generate the optical path differences. Surfaces 21B and 24B remain flat. In FIG. 3C surfaces 22C and 24C incorporate the thickness variations to generate the optical path differences. Surfaces 21C and 23C remain flat. In FIG. 3D surfaces 21D and 24D incorporate the thickness variations. Surfaces 22D and 23D are curved and such a device may be adjusted by moving one or both elements along a curved trajectory. In FIG. 3E, surfaces 21E and 22E both exhibit thickness variations of optical plate 13 and surfaces 23E and 24E exhibit thickness variations of optical plate 12. In the embodiment represented by FIG. 3F the opd difference is not generated by a thickness variation. Instead the opd difference is generated by a variation of refractive index across each of the optical plates. The embodiment in FIG. 3G shows three optical plates rather than two. In this system it is possible to distribute the thickness variation across a plurality of plates, which may offer optical advantages in certain configurations.

In all of the embodiments described it is possible to incorporate in the thickness variations on one or more of the surfaces an additional thickness variation to provide prescription correction. In this way the invention can provide correction for an individual's prescription, which may include astigmatism, in addition to a capacity to adjust the amount of spherical optical power provided by the optical device.

Comparison to Work by Alvarez

The prior art work by Alvarez in U.S. Pat. No. 3,305,294 describes a lens comprised of a pair of lens elements or plates. In its most basic form the lens elements are described in a Cartesian (x,y) coordinate system by the equation:

$$t = A\left(\frac{1}{3}x^3 + xy^2\right),$$

where t is the thickness of the lens element at the coordinate given by x and y, and A is a constant which defines how rapidly the shape of the lens elements change across the lens. The resulting pair of lens elements have a form such as shown in FIG. 5. In an improved form also by Alvarez, the above equation is modified to include extra terms as follows:

$$t = A\left(\frac{1}{3}x^3 + xy^2\right) + Bx^2 + Cxy + Dx + F(y),$$

where coefficient D is used to minimise lens thickness. According to Alvarez, the coefficients B and D and the function F(y) may also be used to adjust the lens element form.

The lens elements when moved equal and opposite amounts in the x-direction change the optical power along a central viewing axis. This arrangement is attractive for variable power corrective eye wear because it is simple and inexpensive to make. However, the above thickness function is designed with a central view direction in mind and does not take into account a gaze angle that varies off the central axis. While this is not a problem for some applications, for corrective eyewear it is a significant problem because of the amount the eye moves away from a central viewing direction. As shown in FIG. 5 as the direction of view moves away from the central gaze direction 100 to even just a small angle θ of gaze 200 off the central direction, it can be seen that the curve and thickness of the lens elements at the gaze angle is different to that at the central viewing direction. Furthermore, in the arrangement of FIG. 5, the direction of gaze includes a spacing between the two lens elements.

FIGS. 10A, 10B, 11A and 11B are contour plots for the variation of mean spherical optical power and cylinder power measured in dioptres (D) for a lens element pair based on the design by Alvarez. The plots show the variation with gaze direction, assuming an eye with a 4 mm pupil. For FIGS. 10A and 10B the mean spherical power for central viewing is 0 D. For FIGS. 11A and 11B the mean spherical power is 2 D. In this arrangement the lens elements are arranged differently to the configuration shown in FIG. 5. The orientation of the lens elements is reversed such that the flat surfaces of the elements face each other and the curved surfaces face outwards, such as shown in FIG. 3A. The lens elements use equations of the form:

$$\varphi_{12}(x, y) = \alpha\left(\frac{1}{3}x^3 + xy^2\right) - \beta x + C, \quad (39)$$

and $$\varphi_{13}(x, y) = -\alpha\left(\frac{1}{3}x^3 + xy^2\right) + \beta x + C, \quad (40)$$

where $\alpha$ has a value of $8.85 \times 10^{-4}$; $\beta = -0.1160$, and $C = 1.77$. The value of $\beta$ was chosen to minimise the lens thickness. A refractive index of 1.59 was assumed for the lens elements. The dimension for length and opd is millimeters. The surface closest to the eye is assumed to be located 35 mm from the point of rotation for different gaze direction.

Figure 10A:
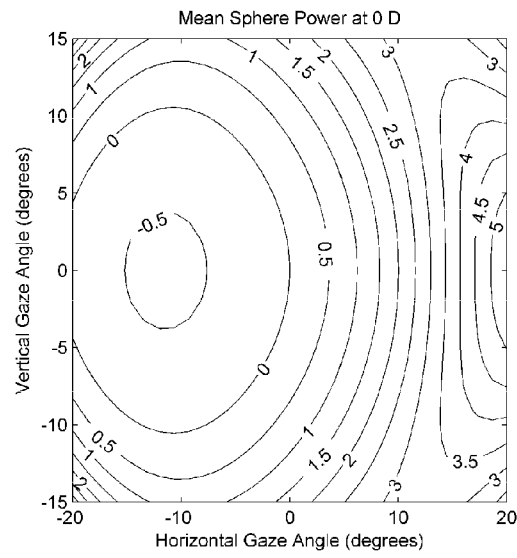
FIGS. 10A and 10B show contour plots for the variation with gaze angle of mean spherical power and cylinder power of an optical device with adjustable power based on the prior art and set at a central viewing power of 0 dioptres.
Figure 10B:
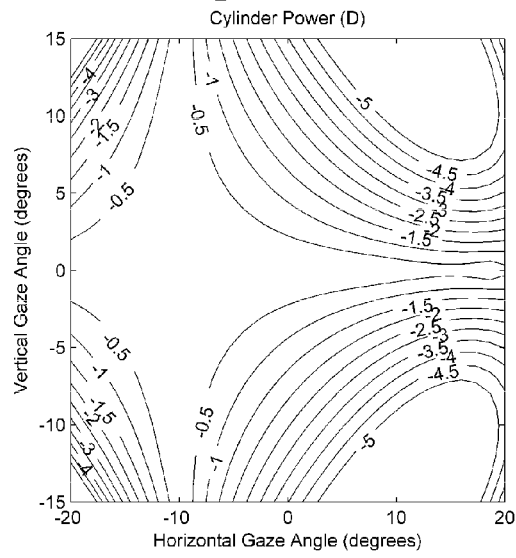

As shown in FIGS. 10A and 10B at a nominal zero dioptres optical power the central viewing region, at 0° for horizontal and vertical gaze angles, the optical power is close 0.0 D. However, moving to +/−10° of horizontal gaze, the optical power reduces to less than −0.5 D in one direction and increase to around +2.0 D to 2.5 D in the opposite direction. For a +/−10° variation in vertical gaze angle, the change in optical power is more symmetric but a 0.7 D change in optical power is found. There is also corresponding significant variation is cylinder power at a nominal 0 D optical power setting as shown in FIG. 10B.

Figure 11A:
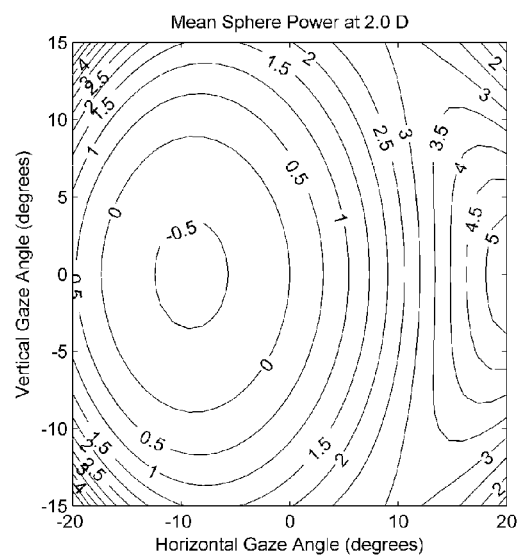
FIGS. 11A and 11B show contour plots for the variation with gaze angle of mean spherical power and cylinder power of an optical device with adjustable power based on the prior art and set at a central viewing power of +2 dioptres.
Figure 11B:
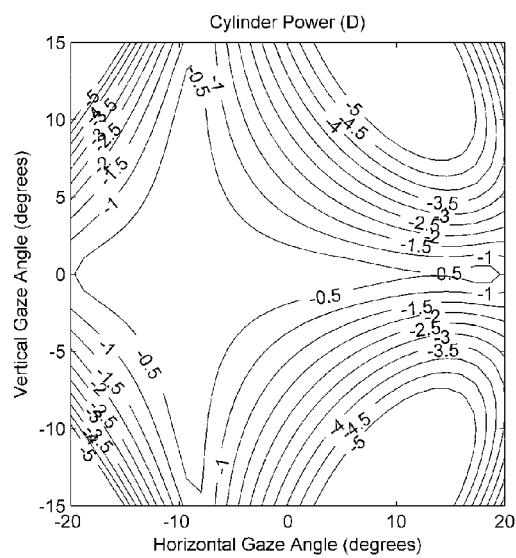
Figure 12A:
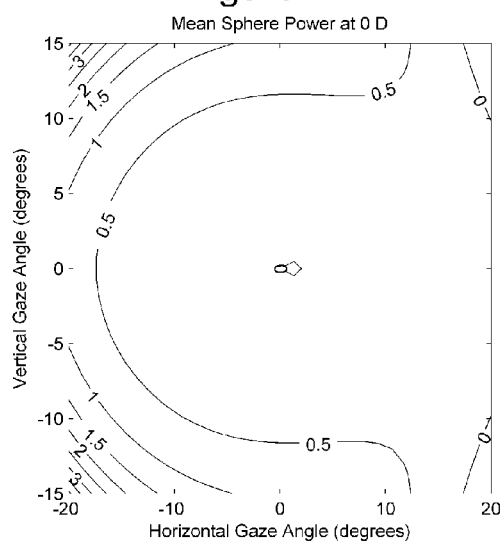
FIGS. 12A and 12B show contour plots for the variation with gaze angle of mean spherical power and cylinder power of an optical device with adjustable power based on an embodiment of the invention with opd functions for the optical plates described by equations 13-14 and set for a central viewing power of 0 dioptres.
Figure 12B:
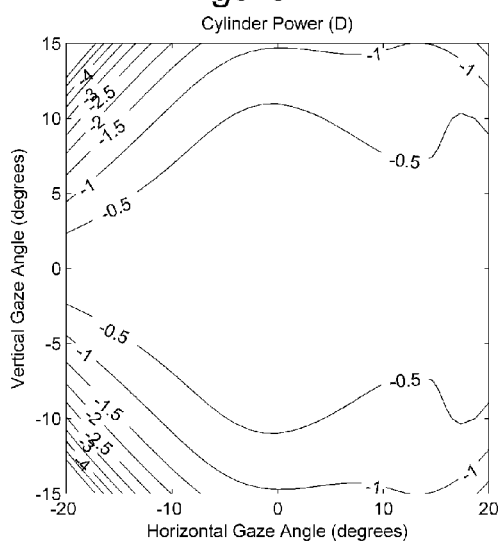
Figure 13A:
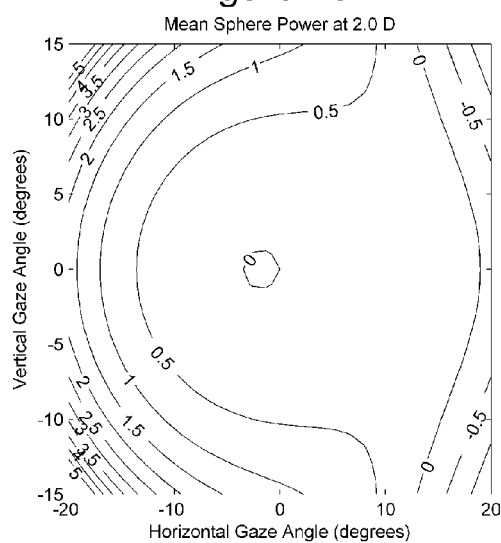
FIGS. 13A and 13B show contour plots for the variation with gaze angle of mean spherical power and cylinder power of an optical device with adjustable power based on an embodiment of the invention with opd functions for the optical plates described by equations 13-14 and set for a central viewing power of +2 dioptres.
Figure 13B:
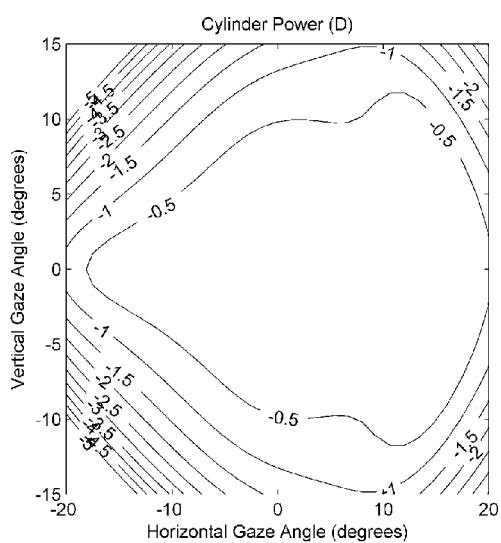
Figure 14A:
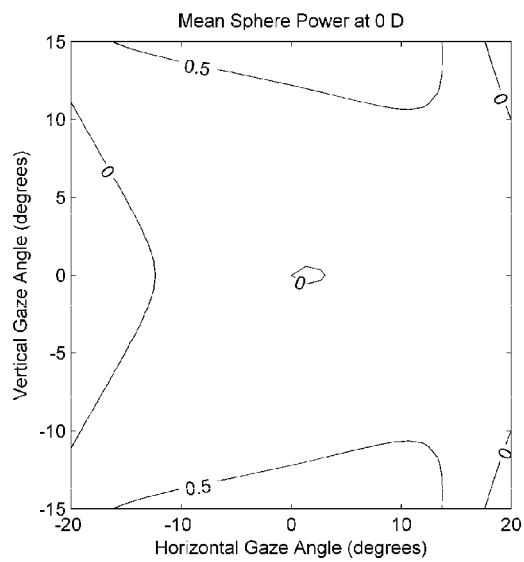
FIGS. 14A and 14B show contour plots for the variation with gaze angle of mean spherical power and cylinder power of an optical device with adjustable power based on an embodiment of the invention with opd functions for the optical plates described by solutions to equations 19-24 and set for a central viewing power of 0 dioptres.
Figure 14B:
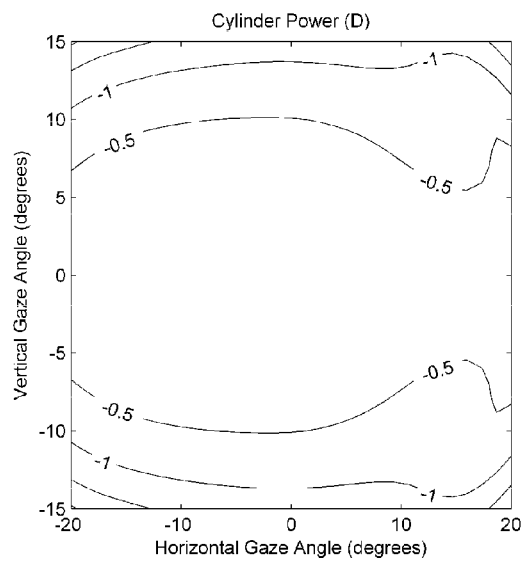
Figure 15A:
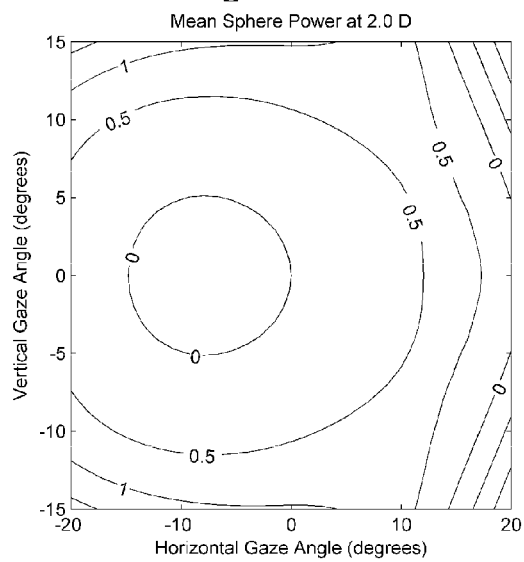
FIGS. 15A and 15B show contour plots for the variation with gaze angle of mean spherical power and cylinder power of an optical device with adjustable power based on an embodiment of the invention with opd functions for the optical plates described by solutions to equations 19-24 and set for a central viewing power of +2 dioptres.
Figure 15B:
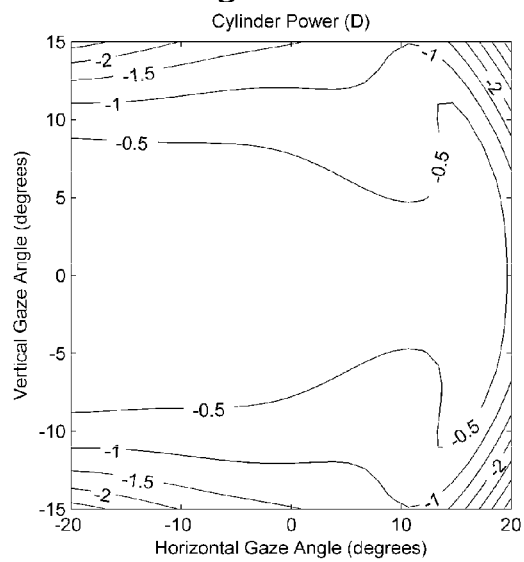

FIGS. 11A and 11B show the sphere and cylinder power variation across the lens when the elements are set to a nominal 2.0 D optical power. An almost identical variation in optical power is seen as gaze angle varies as compared to the 0 D case. For example, +/−10° of horizontal gaze the optical power varies by from −0.5 D to +2.0-2.5 D. The variation in optical power with gaze angle in the vertical direction is almost identical to that for the 0 D case. Significant cylinder power variation is also seen again, with a slightly greater variation than for the 0 D case.

The optical performance of an embodiment of the invention is shown in FIGS. 12A, 12B, 13A, and 13B. These figures show contour plots for mean spherical optical power and cylinder power for an optical system based on an embodiment configured in the manner of FIG. 3A and the plates are configured to move by equal amounts in opposite directions along the x-axis. For FIGS. 12A and 12B the mean spherical power for central viewing is 0 D, for FIGS. 13A and 13B the mean spherical power for central viewing is 2 D. The device described by this embodiment features an opd function for the rear plate described by equation 13, and an opd function for the front plate described by equation 14. The values of the coefficients of the opd functions are given by: $\alpha = 8.85 \times 10^{-4}$, $\beta_{12} = \beta_{13} = 0.116$, $C_{12} = C_{13} = 1.77$, $\gamma_{12} = 0$, and $\gamma_{13} = 4.1153 \times 10^{-6}$. Note that where relevant the coefficients are identical in value to those used for the prior art example as is the plate material of refractive index 1.59. A value of k=−0.895 is used for the correction parameter of the front plate. The functions $F_{12}(x,y)$, $G_{12}(y)$, $F_{13}(x,y)$, $G_{13}(y)$ are all defined to be zero. In this embodiment it can be seen by FIG. 12A that the mean sphere optical power variation for +/−10° of horizontal or vertical gaze is kept largely below 0.5 D at both 0 D and 2.0 D lens power settings. Similarly the cylinder power sees significantly reduced power variation compared to the prior art, with the variation again close to less than 0.5 D for +/−10° of horizontal or vertical gaze at 0 D and 2.0 D.

The optical performance of a preferred embodiment of the invention is shown in FIGS. 14A, 14B, 15A, and 15B. These figures show contour plots for mean spherical optical power and cylinder power for an optical system based on an embodiment configured in the manner of FIG. 3A and the plates are configured to move by equal amounts in opposite directions along the x-axis. For FIGS. 14A and 14B the mean spherical power for central viewing is 0 D, for FIGS. 15A and 15B the mean spherical power for central viewing is 2 D. The device described by this embodiment features an opd function for the rear plate based on a solution to equations 19-21 and an opd function for the front plate based on a solution to equations 22-24. The following functions are used for equations 19-24:

$$J_{12}(x,y) = a_{12}x + b_{12}(x^2+y^2) + c_{12}(x^3+3xy^2), \quad (41)$$

$$J_{13}(x,y) = -1 - k + a_{13}x + b_{13}(x^2+y^2) + c_{13}(x^3+3xy^2), \quad (42)$$

$$K_{12}(x,y) = a_{12}x + b_{12}x^2 + c_{12}x^3, \quad (43)$$

$$K_{13}(x,y) = -1 - k + a_{13}x + b_{13}x^2 + c_{13}x^3, \quad (44)$$

$$L_{12}(x,y) = a_{12}y + 2b_{12}xy + 3c_{13}x^2y, \text{ and} \quad (45)$$

$$L_{13}(x,y) = a_{13}y + 2b_{13}xy + 3c_{13}x^2y \quad (46)$$

A self-consistent solution to equations 19-21 for the opd function of the rear plate, given the definitions in equations 41-43 is given by:

$$\phi_{12}(x, y) = \alpha\left[\frac{x^3}{3} + xy^2 + \frac{a_{12}}{2}\left(\frac{x^4}{6} + x^2y^2\right) + \right. \quad (47)$$

-continued
$$\frac{b_{12}}{3}\left(\frac{x^5}{10}+x^3y^3\right)+\frac{c_{12}}{4}\left(\frac{x^6}{15}+x^4y^2\right)\right]-\beta_{12}x+C_{12}.$$

Similarly, a self-consistent solution to equations 22-24 for the opd function of the front plate, given the definitions in equations 44-46 is given by:

$$\phi_{13}(x,y)=-\alpha\left[-k\left(\frac{x^3}{3}+xy^2\right)+\frac{a_{13}}{2}\left(\frac{x^4}{6}+x^2y^2\right)+\right.\qquad(48)$$
$$\left.\frac{b_{13}}{3}\left(\frac{x^5}{10}+x^3y^2\right)+\frac{c_{13}}{4}\left(\frac{x^6}{15}+x^4y^2\right)\right]+\beta_{13}x+C_{13},$$

where the first order terms in x have been added to control part thickness. The values of the coefficients of the opd functions are given by:
$\alpha=8.85\times10^{-4}$, $\beta_{12}=\beta_{13}=0.116$, $C_{12}=C_{13}=1.77$, $a_{13}=b_{12}=c_{13}=0$, $a_{12}=1.60\times10^{-2}$, $b_{13}=2.00\times10^{-5}$, $c_{12}=1.33\times10^{-5}$ and $k=-0.895$.

Note that where relevant the coefficients are identical in value to those used for the prior art example as is the plate material of refractive index 1.59.

As shown in FIGS. 14A, 14B, 15A and 15B the power variation for the preferred embodiment shows a further improvement over the prior art. The mean sphere power variation for 0 D and 2.0 D shown in FIGS. 14A and 15A has pushed the 0.5 D power change out beyond the +/−10° of horizontal or vertical gaze. The cylinder power variation also shows a reduction in the closeness of neighbouring contours showing a more slowly varying change in cylinder power.

It will be appreciated by those skilled in the art that only a small number of possible embodiments have been described and that many variations and modifications are possible within the scope of the invention. For example movement of one or both of the optical plates may be along a curved path rather than a straight line. It will also be appreciated by those skilled in the art that modifications to the equations and shapes described in the embodiments can be made without departing from the scope of the claimed invention.

The invention claimed is:

1. A method of making a lens having optical power adjustable by relative lateral translation of at least two lens elements, the method comprising:
   providing a function having a first functional part yielding optical properties of a first lens element from geometry of the first lens element,
   the function having a second functional part yielding optical properties of a second lens element from geometry of the second lens element; and
   using the function to derive geometries for making the lens elements,
   wherein the function relates optical path difference to position across the lens elements, and
   the magnitude of the rate of change of curvature of the first functional part with position is different to the magnitude of the rate of change of curvature of the second functional part with position as determined at the same co-ordinate position with respect to a central viewing axis for the first and second lens element.

2. The method of claim 1, wherein the rate of change of curvature of the first functional part and second functional part are related by a multiplier.

3. The method of claim 2, wherein the first lens element is a pupil side lens element and the second lens element is an object side lens element; and
   the multiplier has a magnitude less than unity to stretch, laterally across the lens, the variation of optical properties of the second lens element relative to the first lens element.

4. The method of claim 3, wherein the multiplier has a magnitude less than unity and greater than or equal to 0.5.

5. The method of claim 4, wherein the multiplier has a magnitude in the range 0.99 to 0.7.

6. The method of claim 5, wherein the multiplier has a magnitude in the range 0.99 to 0.9.

7. The method of claim 2, wherein the multiplier is negative such that the direction of variation of optical properties of the first lens element is opposite to the direction of variation of optical properties of the second lens element.

8. The method of claim 1, wherein the rate of change of curvature of the first functional part with position is different to the rate of change of curvature of the second functional part with position, such that at a gaze angle through the lens intersecting the first lens element at a different position to intersection with the second lens element the optical properties of the lens elements at said gaze angle are complementary.

9. The method of claim 1, further comprising:
   refining the function to at least approximate required gaze angle optical performance over a range of said lateral translation; and
   the step of using the function comprises using the refined function to derive geometries for making the lens elements.

10. The method of claim 9, comprising:
    determining the optical performance of the lens at gaze angles and lateral translations;
    refining the function by adjusting parameters of the function to optimize a merit function; and
    iterating the steps of determining and refining until the optical properties meet the required gaze angle optical performance.

11. The method of claim 10, wherein the step of determining comprises ray tracing to simulate the performance of the lens at a plurality of gaze angles.

12. The method of claim 10, wherein the merit function is a measure of the performance of the lens in a single scalar value or a plurality of values.

13. The method of claim 12, wherein the merit function is a measure of at least variation of optical power with gaze angle.

14. The method of claim 13, wherein the merit function further comprises a measure of lens thickness.

15. The method of claim 9, comprising using numerical methods to minimise differences between the function and target values for optical performance with respect to gaze angle.

16. The method of claim 15, wherein the function is a representation of optical path difference, and is a Non-Uniform Rational B-Spline surface (NURBS) or a Zernike polynomial.

17. The method of claim 16, wherein refinements are made by changing the values of parameters associated with the representation.

18. The method of claim 17, wherein the representation uses a Non-Uniform Rational B-Spline surface (NURBS) and the parameters changed are knot locations and control point coordinates.

19. The method of claim 17, wherein the approximate representation uses a Zernike polynomial and the parameters changed are coefficients associated with each polynomial term.

20. The method of claim 9, comprising iteratively refining the function to minimize the difference in gaze angle optical properties compared to a target.

21. The method of claim 20, wherein the target is specified across a range of gaze angles and the target is weighted between a central viewing axis and gaze angles.

22. The method of claim 9, comprising iteratively refining the function to optimize a scalar merit function.

23. A non-transitory computer readable medium comprising computer program code arranged to put into effect the method of claim 9.

24. The method of claim 1, wherein the function yields optical performance of the lens from the geometry and lateral translation of the lens elements.

25. The method of claim 24, wherein the function comprises a relation between optical path difference and geometry of the lens elements.

26. The method of claim 1, wherein the function relates optical path difference to a gaze position through the lens elements.

27. The method of claim 26, wherein gaze position is the position on the lens at which a gaze angle optical path intersects the lens elements.

28. The method of claim 1, wherein the geometries of the lens elements include the optical thickness of the lens elements based on the refractive index of material for making the lens elements.

29. The method of claim 1, wherein a rate of change of curvature is a rate of change of curvature of a surface of a lens element.

30. The method of claim 1, wherein the first functional part yielding optical path difference $\phi_{12}$ of a first lens element from $$\varphi_{12}(x, y) = \alpha\left(\frac{1}{3}x^3 + xy^2\right)$$

and
the second functional part yielding optical path difference $\phi_{13}$ of a second lens element from $$\varphi_{13}(x, y) = k\left[\alpha\left(\frac{1}{3}x^3 + xy^2\right)\right]$$

where x and Y are coordinate position on the respective lens element with respect to an origin centred at the central viewing axis of the lens element, $\alpha$ is a constant related to the rate of change of optical properties with lateral translation, and k is a multiplier having a magnitude less than unity to stretch, laterally across the lens, the variation of optical properties of the second lens element relative to the first lens element.

31. The method of claim 1, further comprising determining the optical power across the lens at a lateral translation by calculating curvature of the optical path difference with respect to gaze angle.

32. The method of claim 31, further comprising determining the optical power across the lens at a plurality of lateral translations and optimizing the function to minimize variations in a required optical power with gaze angle.

33. The method of claim 1, wherein the lens has a central viewing axis centred with respect to gaze angles, and the relative lateral translation is along a trajectory crossing the central viewing axis.

34. The method of claim 33, wherein the trajectory intersects the central viewing axis substantially orthogonally.

35. The method of claim 33, wherein the trajectory is defined by a two or three-dimensional path.

36. The method of claim 35, wherein the trajectory is substantially a straight line or arcuate line.

37. The method of claim 1, wherein the function relates position on the lens to optical path difference using a Cartesian coordinate system with the z-axis along a central viewing axis and the x-axis and y-axis lie in a plane approximately perpendicular to the central viewing axis, and the x axis is aligned with the lateral translation direction.

38. The method of claim 37, wherein the function is refined to take account of a change of optical power of a wavefront with propagation distance.

39. The method of claim 38, comprising including an $x^4$ and $x^2y^2$ term to the function relating position to optical path difference.

40. The method of claim 39, wherein the $x^4$ and $x^2y^2$ term is of the form $$\gamma_{12}\left(\frac{1}{12}x^4 + \frac{1}{2}x^2y^2\right)$$

for the first lens, and of the form $$\gamma_{13}\left(\frac{1}{12}x^4 + \frac{1}{2}x^2y^2\right)$$

for the second lens, wherein $\gamma_{12}$ and $\gamma_{13}$ are different such that the variation of optical properties of the second lens element is different relative to the first lens element.

41. The method of claim 1, wherein optical path difference $\phi_{12}$ for a pupil side lens element satisfies:

$$\frac{\partial^3 \varphi_{12}}{\partial x^3} = 2\alpha[1 + J_{12}(x, y)], \frac{\partial^3 \varphi_{12}}{\partial x \partial y^2} = 2\alpha[1 + K_{12}(x, y)], \text{ and}$$

$$\frac{\partial^3 \varphi_{12}}{\partial x^2 \partial y} = 2\alpha J_{12}(x, y);$$

and optical path difference $\phi_{13}$ for an object side lens element satisfies:

$$\frac{\partial^3 \varphi_{13}}{\partial x^3} = -2\alpha[1 + J_{13}(x, y)], \frac{\partial^3 \varphi_{13}}{\partial x \partial y^2} = -2\alpha[1 + K_{13}(x, y)], \text{ and}$$

$$\frac{\partial^3 \varphi_{13}}{\partial x^2 \partial y} = -2\alpha J_{13}(x, y),$$

where $\alpha$ is a constant and $J_{12}(x,y)$, $J_{13}(x,y)$, $K_{12}(x,y)$, $K_{13}(x,y)$, $L_{12}(x,y)$ and $L_{13}(x,y)$ are dimensionless functions of the (x,y) lens element coordinates, wherein at least one of $J_{12}(x,y)$, $J_{13}(x,y)$, $K_{12}(x,y)$, $K_{13}(x,y)$, $L_{12}(x,y)$ and $L_{13}(x,y)$ are non-zero.

42. The method of claim 41, wherein the optical path differences $\phi_{12}$ and $\phi_{13}$ are solutions of the partial differential equations for optical path difference.

43. The method of claim 41, wherein the optical path differences $\phi_{12}$ and $\phi_{13}$ are approximate solutions of the partial differential equations for optical path difference determined by numerical methods.

44. The method of claim 1, wherein optical path difference $\phi_{12}$ for a pupil side lens element satisfies:

$$\frac{d}{ds}\bigg|_{s_0}\left[\frac{\partial^2 \varphi_{12}}{\partial x^3}\right] = 2\alpha[1 + M_{12}(x, y)],$$

$$\frac{d}{ds}\bigg|_{s_0}\left[\frac{\partial^2 \varphi_{12}}{\partial y^3}\right] = 2\alpha[1 + N_{12}(x, y)], \text{ and}$$

$$\frac{d}{ds}\bigg|_{s_0}\left[\frac{\partial^2 \varphi_{12}}{\partial x \partial y}\right] = 2\alpha Q_{12}(x, y);$$

and optical path difference $\phi_{13}$ for an object side lens element satisfies:

$$\frac{d}{ds}\bigg|_{s_0}\left[\frac{\partial^2 \varphi_{12}}{\partial x^2}\right] = -2\alpha[1 + M(x, y)],$$

$$\frac{d}{ds}\bigg|_{s_0}\left[\frac{\partial^2 \varphi_{13}}{\partial y^2}\right] = -2\alpha[1 + N_{13}(x, y)], \text{ and}$$

$$\frac{d}{ds}\bigg|_{s_0}\left[\frac{\partial^2 \varphi_{13}}{\partial x \partial y}\right] = -2\alpha Q_{13}(x, y),$$

where $s_0$ is a reference point along a trajectory parameterized by s along which the lens elements are translated, $\alpha$ is a constant and $M_{12}(x,y)$, $M_{13}(x,y)$, $N_{12}(x,y)$, $N_{13}(x,y)$, $Q_{12}(x,y)$ and $Q_{13}(x,y)$ are dimensionless functions of the (x,y) lens element coordinates, wherein at least one of $M_{12}(x,y)$, $M_{13}(x,y)$, $N_{12}(x,y)$, $N_{13}(x,y)$, $Q_{12}(x,y)$ and $Q_{13}(x,y)$ are non-zero.

45. The method of claim 1, further comprising calculating a lens optical path difference based on the function and reducing the lens optical path difference at the periphery by including one or more zones, each zone having an optical path difference reduced by a constant, and successive zones having a different constant for optical path difference reduction.

46. The method of claim 45, wherein the zones are Fresnel zones.

47. The method of claim 45, wherein optical path difference $\phi'_{12}(x,y)$ for a pupil side lens element within each zone is denoted by an index i and comprises an offset by a value held constant within each zone, $\psi_{12}^{(i)}$, compared to a lens element in the absence of the zone, and optical path difference $\phi'_{13}(x,y)$ for an object side lens element within each zone is denoted by an index j and comprises an offset by a value held constant within each zone, $\psi_{13}^{(j)}$, compared to a lens element in the absence of the zone, where, $\phi'_{12}(x,y)$ and $\phi'_{13}(x,y)$ are given by the following equations:

$\phi'_{12}(x,y)=\phi_{12}(x,y)-\psi_{12}^{(i)}+D_{12}$, and $\phi'_{13}(x,y)=\phi_{13}(x,y)-\psi_{13}^{(j)}+D_{13}$.

48. The method of claim 47, wherein the index value of a particular (x,y) coordinate on the lens elements and the corresponding optical path difference function offset constants are given by:

$$i = \text{floor}\left[\frac{\varphi_{12}(x, y) - E_{12}}{H_{12}}\right],$$

-continued $$\psi_{12}^{(i)} = iH_{12},$$

$$j = \text{floor}\left[\frac{\varphi_{13}(x, y) - E_{13}}{H_{13}}\right], \text{ and}$$

$$\psi_{13}^{(j)} = jH_{13},$$

where $E_{12}$, $H_{12}$, $E_{13}$, $H_{13}$ are constants with $H_{12}$ and $H_{13}$ controlling the magnitude of the variations of the optical path difference functions and $E_{12}$ and $E_{13}$ providing control over the position of the zone boundaries; and the function 'floor' returns the value of the lowest integer below or equal to the input to the function.

49. The method of claim 1, further comprising calculating a lens thickness based on the function and reducing the lens thickness at the periphery by including one or more zones, each zone having a thickness reduced by a constant, and successive zones having a different constant for thickness reduction.

50. The method of claim 1, further comprising defining a blending region at the edge of the lens, the blending region providing mechanical constraints on lens thickness for mounting, and providing surface continuity with a viewing region.

51. The method of claim 1, wherein the relative lateral translation comprises laterally translating the lens elements in opposite directions to adjust said optical power.

52. The method of claim 51, further comprising including in the function a prescription correction feature to the lens.

53. The method of claim 52, wherein the prescription feature is a bifocal or multifocal feature to the lens.

54. The method of claim 1, wherein the relative lateral translation comprises maintaining one lens element fixed with respect to a pupil, and laterally translating the other lens element to adjust said optical power.

55. The method of claim 54, further comprising including variable prismatic correction to the translatable lens element.

56. The method of claim 55, wherein the variable prismatic correction comprises adding a function proportional to $x^2$ to an optical path difference function for the translatable lens element.

57. The method of claim 1, comprising optimizing the gaze angle optical properties for a designated application.

58. The method of claim 57, wherein the designated application is ophthalmic lenses for eyeglasses.

59. The method of claim 58, wherein a trajectory of the relative lateral translation orthogonally intersects a central viewing axis of the lens and follows a direction along a line joining the pair of lenses of the eyeglasses.

60. The method of claim 58, wherein the required gaze angle optical properties for the eyeglasses is less than 1.0 dioptres optical power variation across substantially all gaze angles.

61. The method of claim 1, further comprising making the lens.

62. A non-transitory computer readable medium comprising computer program code that, when executed by a computer, implements the method of claim 1.

63. A lens having optical power adjustable by relative lateral translation of at least two elements, the lens comprising:
 a first lens element having an optical path difference through the lens element varying as a first function of position across the lens element;
 a second lens element having an optical path difference through the lens element varying as a second function of position across the lens element, said second lens element being an object side lens element, wherein the first and second function are related by a multiplier having a magnitude less than unity to vary the rate of change of curvature of the second lens element relative to the first lens element at the same co-ordinate position with respect to a central viewing axis for the first and second lens elements.

64. The lens of claim 63, wherein the first function and second function together relate the optical path difference through the lens to the co-ordinate position across the lens.

65. The lens of claim 63, wherein the lens elements are arranged to from the lens such that the multiplier is negative such that the optical path difference variation of the first lens element is in an opposite lateral direction to the optical path difference variation of the second lens element.

66. The lens of claim 63, wherein the multiplier has a magnitude less than unity and greater than or equal to 0.5.

67. The lens of claim 66, wherein the multiplier has a magnitude in the range 0.99 to 0.7.

68. The lens of claim 67, wherein the multiplier has a magnitude in the range 0.99 to 0.9.

69. The lens of claim 63, wherein the first lens element is of constant refractive index and position dependent thickness determines optical path difference.

70. The lens of claim 63, wherein the second lens element is of constant refractive index and the position dependent thickness determines optical path difference.

71. Corrective eyewear comprising one or two lenses according to claim 63.

* * * * *